(12) United States Patent
Bergström et al.

(10) Patent No.: US 11,304,237 B2
(45) Date of Patent: Apr. 12, 2022

(54) RANDOM ACCESS WITH DIFFERENT TTI DURATIONS

(71) Applicant: Telefonaktiebolaget LM Ericsson (publ), Stockholm (SE)

(72) Inventors: Mattias Bergström, Sollentuna (SE); Cecilia Eklöf, Täby (SE); Mårten Sundberg, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 79 days.

(21) Appl. No.: 16/767,942

(22) PCT Filed: Nov. 28, 2018

(86) PCT No.: PCT/EP2018/082777
§ 371 (c)(1),
(2) Date: May 28, 2020

(87) PCT Pub. No.: WO2019/105970
PCT Pub. Date: Jun. 6, 2019

(65) Prior Publication Data
US 2020/0374935 A1 Nov. 26, 2020

Related U.S. Application Data

(60) Provisional application No. 62/591,680, filed on Nov. 28, 2017.

(51) Int. Cl.
*H04W 72/04* (2009.01)
*H04W 74/08* (2009.01)
(Continued)

(52) U.S. Cl.
CPC ....... *H04W 74/0833* (2013.01); *H04L 5/0082* (2013.01); *H04W 56/0045* (2013.01);
(Continued)

(58) Field of Classification Search
None
See application file for complete search history.

(56) References Cited

U.S. PATENT DOCUMENTS

2015/0305065 A1* 10/2015 Bai ............... H04W 74/002 370/329
2016/0219569 A1* 7/2016 Kuo ............... H04W 74/0833
(Continued)

OTHER PUBLICATIONS

International Search Report and Written Opinion of the International Searching Authority for PCT International Application No. PCT/EP2018/082777 dated Jan. 23, 2019.
(Continued)

*Primary Examiner* — Brandon M Renner
(74) *Attorney, Agent, or Firm* — Sage Patent Group

(57) ABSTRACT

A method of operating a mobile terminal, UE, to perform a random access, RA, procedure may be provided. A short duration RA preamble may be transmitted for the RA procedure, wherein the short duration RA preamble is transmitted using a short duration transmission time interval, TTI. A long duration RA preamble may be transmitted for the RA procedure, wherein the long duration RA preamble is transmitted using a long duration TTI, and wherein the long duration TTI is longer than the short duration TTI.

20 Claims, 20 Drawing Sheets

(51) Int. Cl.
*H04W 76/18* (2018.01)
*H04W 76/27* (2018.01)
*H04L 5/00* (2006.01)
*H04W 56/00* (2009.01)
*H04W 80/08* (2009.01)

(52) U.S. Cl.
CPC ....... *H04W 72/0446* (2013.01); *H04W 76/18* (2018.02); *H04W 76/27* (2018.02); *H04W 80/08* (2013.01)

(56) References Cited

U.S. PATENT DOCUMENTS

| | | | |
|---|---|---|---|
| 2017/0111933 A1 | 4/2017 | Wu | |
| 2018/0279387 A1* | 9/2018 | Hui | H04W 74/0833 |
| 2019/0132850 A1* | 5/2019 | Sun | H04W 72/005 |
| 2019/0319686 A1* | 10/2019 | Chen, IV | H04W 48/20 |
| 2019/0350005 A1* | 11/2019 | Liu | H04W 68/005 |

OTHER PUBLICATIONS

InterDigital Communications, "Random Access Procedure in NR," R2-1702869, 3GPP TSG-RAN WG2 Meeting #97bis, Spokane, USA, Apr. 3-7, 2017, pp. 1-2.

3GPP TS 36.331 V14.4.0, "3rd Generation Partnership Project; Technical Specification Group Radio Access Network Evolved Universal Terrestrial Radio Access (E-UTRA); Radio Resource Control (RRC); Protocol specification (Release 14)," Technical Specification, Sep. 2017, 730 pages.

3GPP TS 36.321 V14.4.0, "3rd Generation Partnership Project; Technical Specification Group Radio Access Network Evolved Universal Terrestrial Radio Access (E-UTRA); Medium Access Control (MAC) protocol specification (Release 14)," Technical Specification, Sep. 2017, 108 pages.

* cited by examiner

2/3 sTTI Configuration Within An Uplink Subframe

Random Access Procedure

RANDOM ACCESS WITH DIFFERENT TTI DURATIONS

CROSS REFERENCE TO RELATED APPLICATIONS

This application is a 35 U.S.C. § 371 national stage application of PCT International Application No. PCT/EP2018/082777 filed on Nov. 28, 2018, which claims the benefit of U.S. Provisional Patent Application Ser. No. 62/591,680, filed on Nov. 28, 2017, the disclosures and content of which are incorporated by reference herein in their entireties.

TECHNICAL FIELD

The present disclosure relates generally to wireless communications, and more particularly to random access wireless communication methods and related mobile terminals and network nodes.

BACKGROUND

Packet data latency is one of the performance metrics that vendors, operators, and end-users (via speed test applications) regularly measure. Latency measurements are performed in all phases of a radio access network system lifetime, when verifying a new software release or system component, when deploying a system and when the system is in commercial operation.

Shorter latency than previous generations of 3GPP RATs was one performance metric that guided the design of Long-Term Evolution (LTE). The end-users also now recognize LTE to be a system that provides faster access to internet and lower data latencies than previous generations of mobile radio technologies.

Packet data latency may be important not only for the perceived responsiveness of the system; but also as a parameter that indirectly influences the throughput of the system. HTTP/TCP is the dominating application and transport layer protocol suite used on the internet today. According to HyperText Transfer Protocol HTTP Archive (http://httparchive.org/trends.php) the typical size of HTTP based transactions over the internet are in the range of a few 10's of Kbyte up to 1 Mbyte. In this size range, the Transmission Control Protocol TCP slow start period is a significant part of the total transport period of the packet stream. During TCP slow start the performance is latency limited. Hence, improved latency can rather easily be showed to improve the average throughput, for this type of TCP based data transactions.

Latency reductions could positively impact radio resource efficiency. Lower packet data latency could increase the number of transmissions possible within a certain delay bound; hence higher Block Error Rate (BLER) targets could be used for the data transmissions freeing up radio resources potentially improving the capacity of the system.

One approach to latency reduction is the reduction of transport time of data and control signaling, by addressing the length of a transmission time interval (TTI). By reducing the length of a TTI and maintaining the bandwidth, the processing time at the transmitter and the receiver nodes is also expected to be reduced, due to less data to process within the TTI. As described in section 2.1.1, in LTE release 8, a TTI corresponds to one subframe (SF) of length 1 millisecond. One such 1 ms TTI is constructed by using 14 OFDM (Orthogonal Frequency Division Multiplexing) or SC-FDMA (Single Carrier Frequency Division Multiple Access) symbols in the case of normal cyclic prefix and 12 OFDM or SC-FDMA symbols in the case of extended cyclic prefix. In LTE release 14 in 3GPP, a study item on latency reduction has been conducted, with the goal of specifying transmissions with shorter TTIs, such as a slot or a few symbols. A work item with the goal of specifying short TTI (sTTI) started in August 2016.

An sTTI can be decided to have any duration in time and comprise resources on any number of OFDM or SC-FDMA symbols, and start at symbol position within the overall frame. For the work in LTE (Long Term Evolution) the focus of the work currently is to only allow the sTTIs to start at fixed positions with durations of either 2, 3, 4 or 7 symbols. Furthermore, currently an sTTI is not allowed to cross either slot or subframe boundaries.

One example shown in FIG. 1, where the duration of the uplink short TTI is 0.5 ms, i.e. seven SC-FDMA symbols for the case with normal cyclic prefix. Also a combined length of 2 or 3 symbols are shown for the sTTI. Here, the "R" in the Figures indicates the DMRS (Demodulation Reference Signal) symbols, and "D" indicates the data symbols. Other configurations are not excluded, and the figure is only an attempt to illustrated differences in sTTI lengths. FIG. 1 illustrates an example of a ⅔-symbol sTTI configuration within an uplink subframe.

Although a shorter TTI may have merit when it comes to latency, it can also have specifically negative impact to the UL coverage since less energy is transmitted by the UE, specifically considering the UL control channel performance, which includes both HARQ bits, Channel quality information, CQI, and Scheduling Request.

Due to the limited UL coverage when transmitting a shortened TTI, it is possible to configure a longer TTI length on the UL than in the DL to combat these problems, with the standard supporting sTTI length combination in the {DL, UL} of {2,7}. There is also the possibility of the network to schedule the UE with 1 ms TTI duration dynamically on a subframe-to-subframe basis.

Downlink DL and uplink UL sTTI scheduling will now be discussed. To schedule an uplink or a downlink sTTI transmission, it is possible for the eNB to transmit the corresponding control information by using a new DCI (Downlink Control Information) format, referred to as short DCI (sDCI), in each DL sTTI. The control channel carrying this sDCI can be either PDCCH or sPDCCH. Since sPDCCH is included in each sTTI and there can be up to 6 sTTIs per LTE subframe, a UE should monitor sDCI in PDCCH and in up to 6 instances of sPDCCH per subframe.

A Random Access (RA) Procedure is illustrated in FIG. 2. A mobile terminal may perform random access on its primary component carrier only. Either a contention based or a contention-free scheme can be used. Contention-based random access may use a four operation procedure, illustrated in FIG. 2, with the following operations:

1. The transmission of a random-access preamble, allowing the eNodeB to estimate the transmission timing of the mobile terminal. Uplink synchronization may be necessary as the mobile terminal otherwise may be unable to transmit any uplink data.
2. The network transmits a timing advance command to adjust the mobile terminal transmit timing, based on the timing estimate obtained in the first step. In addition to establishing uplink synchronization, the second step also assigns uplink resources to the mobile terminal to be used in the third step in the random-access procedure.

3. The transmission of the mobile-terminal identity to the network using the UL-SCH similar to normal scheduled data. The exact content of this signaling depends on the state of the mobile terminal, in particular whether it is previously known to the network or not.
4. The final operation includes transmission of a contention-resolution message from the network to the mobile terminal on the DL-SCH. This step also resolves any contention due to multiple mobile terminals trying to access the system using the same random-access resource.

Contention-free random access can be used for re-establishing uplink synchronization upon downlink data arrival, handover, and positioning. Only the first two operations of the procedure of FIG. 2 are used as there is no need for contention resolution in a contention-free scheme.

Random Access problems will now be discussed. An excerpt from 36.321 v14.4.0 is shown below. This except describes that, a mobile terminal which has transmitted a preamble and does not receive a random access response will increase a counter (PREAMBLE_TRANSMISSION_COUNTER) for each preamble the UE has transmitted. When this counter reaches a certain value (preambleTransMax+1), the UE will, if the preamble was transmitted on an SpCell indicate Random Access problems to upper layers (i.e., Radio Resource Control RRC). 36.321 v14.4.0 states that:

If no Random Access Response or, for NB-IoT UEs, BL UEs or UEs in enhanced coverage for mode B operation, no PDCCH scheduling Random Access Response is received within the RA Response window, or if none of all received Random Access Responses contains a Random Access Preamble identifier corresponding to the transmitted Random Access Preamble, the Random Access Response reception is considered not successful and the MAC entity shall:
  if the notification of power ramping suspension has not been received from lower layers:
    increment PREAMBLE_TRANSMISSION_COUNTER by 1;
  if the UE is an NB-IoT UE, a BL UE or a UE in enhanced coverage:
    if PREAMBLE_TRANSMISSION_COUNTER= preambleTransMax-CE+1:
      if the Random Access Preamble is transmitted on the SpCell:
        indicate a Random Access problem to upper layers;
        if NB-IoT:
          consider the Random Access procedure unsuccessfully completed;
  else:
    if PREAMBLE_TRANSMISSION_COUNTER= preambleTransMax+1:
      if the Random Access Preamble is transmitted on the SpCell:
        indicate a Random Access problem to upper layers;
      if the Random Access Preamble is transmitted on an SCell:
        consider the Random Access procedure unsuccessfully completed.
  if in this Random Access procedure, the Random Access Preamble was selected by MAC:
    based on the backoff parameter, select a random backoff time according to a uniform distribution between 0 and the Backoff Parameter Value;
    delay the subsequent Random Access transmission by the backoff time;
  else if the SCell where the Random Access Preamble was transmitted is configured with u1-Configuration-r14:
    delay the subsequent Random Access transmission until the Random Access Procedure is initiated by a PDCCH order with the same ra-PreambleIndex and ra-PRACH-MaskIndex;
  if the UE is an NB-IoT UE, a BL UE or a UE in enhanced coverage:
    increment PREAMBLE_TRANSMISSION_COUNTER_CE by 1;
    if PREAMBLE_TRANSMISSION_COUNTER_CE=maxNumPreambleAttemptCE for the corresponding enhanced coverage level+1:
      reset PREAMBLE_TRANSMISSION_COUNTER_CE;
      consider to be in the next enhanced coverage level, if it is supported by the Serving Cell and the UE, otherwise stay in the current enhanced coverage level;
    if the UE is an NB-IoT UE:
      if the Random Access Procedure was initiated by a PDCCH order:
        select the PRACH resource in the list of UL carriers providing a PRACH resource for the selected enhanced coverage level for which the carrier index is equal to ((Carrier Index from the PDCCH order) modulo (Number of PRACH resources in the selected enhanced coverage));
        consider the selected PRACH resource as explicitly signalled;
  proceed to the selection of a Random Access Resource (see subclause 5.1.2).

Below is an excerpt from 36.331 v14.4.0 (which is the RRC specification for LTE). It describes how the UE will consider radio link failure (RLF) to have been detected when MAC indicates random access problems (as shown above). RLF in its turn. 36.331 v14.4.0 states that:

5.3.11.3 Detection of Radio Link Failure
The UE shall:
1> upon T310 expiry; or
1> upon T312 expiry; or
1> upon random access problem indication from MCG MAC while neither T300, T301, T304 nor T311 is running; or
1> upon indication from MCG RLC that the maximum number of retransmissions has been reached for an SRB or for an MCG or split DRB:
  2> consider radio link failure to be detected for the MCG i.e. RLF;
[ . . . ]
  2> if AS security has not been activated:
    3> if the UE is a NB-IoT UE:
      4> if the UE supports RRC connection re-establishment for the Control Plane CIoT EPS optimisation:
        5> initiate the RRC connection re-establishment procedure as specified in 5.3.7;
      4> else:
        5> perform the actions upon leaving RRC_CONNECTED as specified in 5.3.12, with release cause 'RRC connection failure':

3> else:
    4> perform the actions upon leaving RRC_CON-
      NECTED as specified in 5.3.12, with release
      cause 'other';
  2> else:
    3> initiate the connection re-establishment proce-
      dure as specified in 5.3.7;

Radio link failure RLF may thus occur during a random access, RA, procedure causing a mobile terminal to release its connection and perform connection re-establishment resulting it increased signaling overhead and/or interruptions in communication.

SUMMARY

According to some embodiments of inventive concepts, a method may be provided to operate a mobile terminal (UE) performing a random access, RA, procedure. A short duration RA preamble for the RA procedure may be transmitted using a short duration transmission time interval, TTI. A long duration RA preamble for the RA procedure may be transmitted using a long duration TTI. Moreover, the long duration TTI may be longer than the short duration TTI.

According to some other embodiments of inventive concepts, a method may be provided to operate a mobile terminal (UE) performing random access, RA, procedures. A short duration RA preamble for a first RA procedure may be transmitted to a radio access network using a short duration transmission time interval, TTI. A long duration RA preamble for a second RA procedure may be transmitted to the radio access network using a long duration TTI. Moreover, the long duration TTI may be longer than the short duration TTI.

According to some embodiments disclosed herein, signaling overhead and/or interruptions in communication may be reduced.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
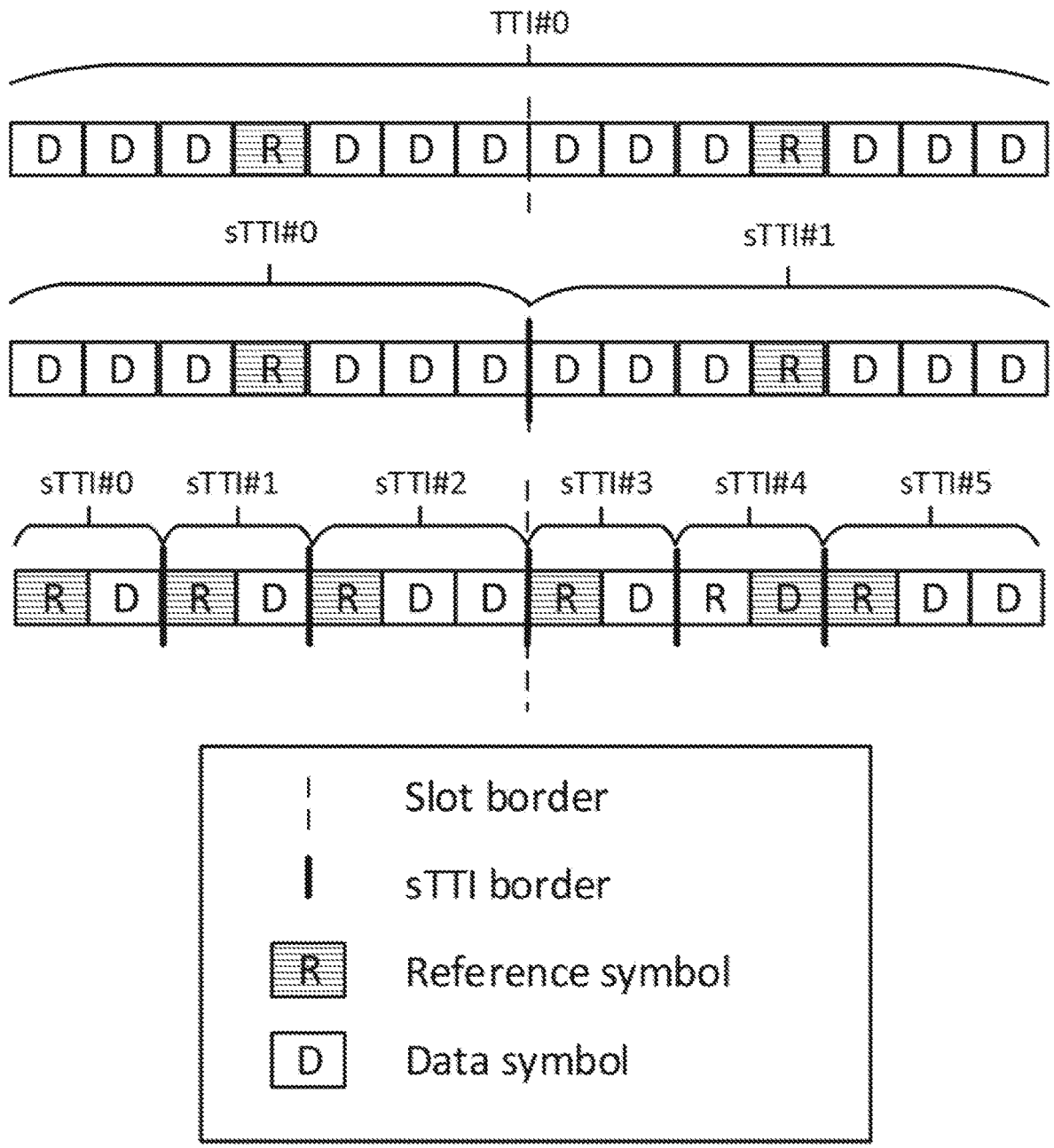
FIG. 1 is a diagram illustrating ⅔ short transmission time interval sTTI configuration within an uplink subframe.
Figure 2:
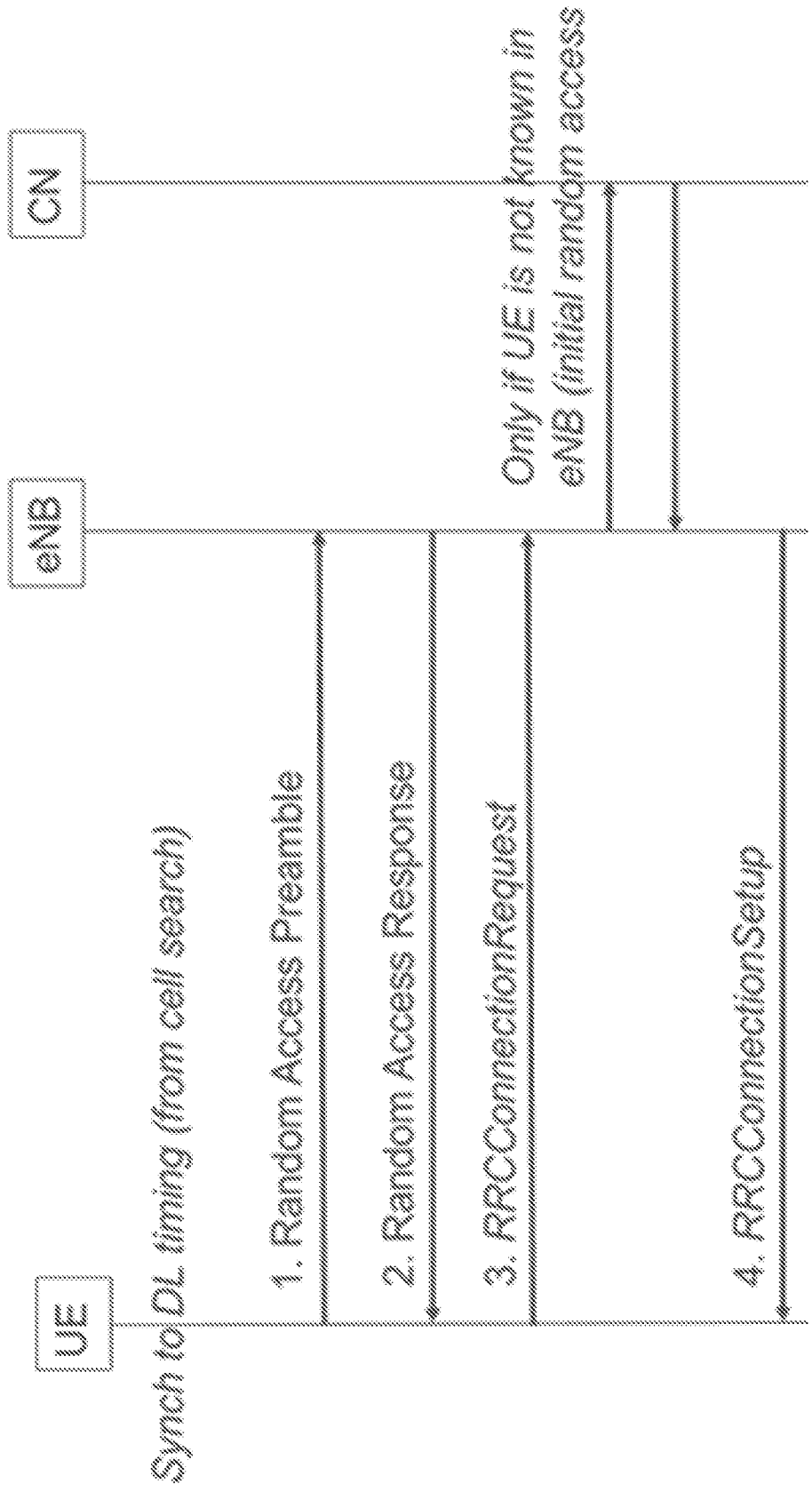
FIG. 2 is a diagram illustrating messages/operations of a random-access RA procedure.
Figure 3:
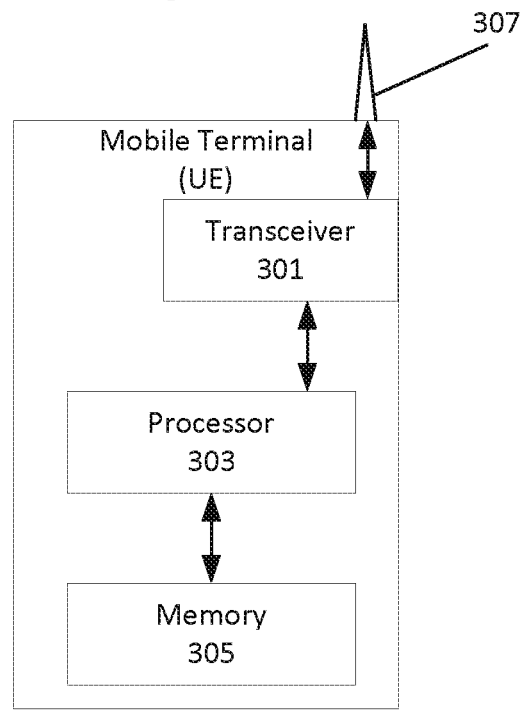
FIG. 3 is a block diagram illustrating a mobile terminal according to some embodiments of inventive concepts.

FIG. 3 is a block diagram illustrating elements of a mobile terminal (also referred to as a wireless device, a wireless communication device, a wireless terminal, a wireless communication terminal, user equipment, a user equipment node/terminal/device, etc.) configured to provide wireless communication according to embodiments of inventive concepts. As shown, the mobile terminal or UE may include an antenna 307, and a transceiver circuit 301 (also referred to as a transceiver) including a transmitter and a receiver configured to provide uplink and downlink radio communications with a base station(s) of a radio access network. Mobile terminal UE may also include a processor circuit 303 (also referred to as a processor) coupled to the transceiver circuit, and a memory circuit 305 (also referred to as memory) coupled to the processor circuit. The memory circuit 305 may include computer readable program code that when executed by the processor circuit 303 causes the processor circuit to perform operations according to embodiments disclosed herein. According to other embodiments, processor circuit 303 may be defined to include memory so that a separate memory circuit is not required. Mobile terminal UE may also include an interface (such as a user interface) coupled with processor 303, and/or the mobile terminal may be incorporated in a vehicle.

As discussed herein, operations of the mobile terminal may be performed by processor 303 and/or transceiver 301. For example, processor 303 may control transceiver 301 to transmit communications through transceiver 301 over a radio interface to another UE and/or to receive communications through transceiver 301 from another UE over a radio interface. Moreover, modules may be stored in memory 305, and these modules may provide instructions so that when instructions of a module are executed by processor 303, processor 303 performs respective operations (e.g., operations discussed below with respect to Example Embodiments).

Figure 4:
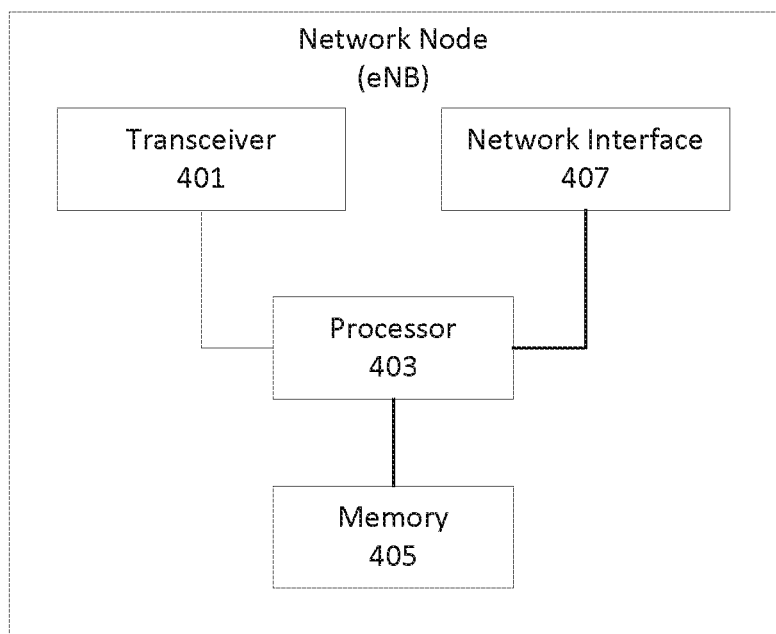
FIG. 4 is a block diagram illustrating a network node (e.g., a base station or eNB) according to some embodiments of inventive concepts.

FIG. 4 is a block diagram illustrating elements of a network node eNB (also referred to as a network node, base station, eNodeB, etc.) of a Radio Access Network (RAN) configured to provide cellular communication according to embodiments of inventive concepts. As shown, the network node eNB may include a transceiver circuit 401 (also referred to as a transceiver) including a transmitter and a receiver configured to provide uplink and downlink radio communications with mobile terminals. The network node may include a network interface circuit 407 (also referred to as a network interface) configured to provide communications with other nodes (e.g., with other base stations) of the RAN. The network node may also include a processor circuit 403 (also referred to as a processor) coupled to the transceiver circuit, and a memory circuit 405 (also referred to as memory) coupled to the processor circuit. The memory circuit 405 may include computer readable program code that when executed by the processor circuit 403 causes the processor circuit to perform operations according to embodiments disclosed herein. According to other embodiments, processor circuit 403 may be defined to include memory so that a separate memory circuit is not required.

As discussed herein, operations of the network node eNB may be performed by processor 403, network interface 407, and/or transceiver 401. For example, processor 403 may control transceiver 401 to transmit communications through transceiver 401 over a radio interface to one or more mobile terminals UEs and/or to receive communications through transceiver 401 from one or more mobile terminals UEs over a radio interface. Similarly, processor 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processor 403, processor 403 performs respective operations (e.g., operations discussed below with respect to Example Embodiments).

According to some other embodiments, the network node eNB may be implemented as a control node without a transceiver. In such embodiments, transmission to a mobile terminal may be initiated by the network node so that transmission to the wireless terminal is provided through a network node including a transceiver, e.g., through a base station. According to embodiments where the network node is a base station including a transceiver, initiating transmission may include transmitting through the transceiver.

As discussed above, random access failure may trigger Radio Link Failure RLF. RLF in its turn may trigger the mobile terminal to perform connection re-establishment where the UE basically releases its configuration, selects a cell (which may or may not be the same cell as the UE was connected to) and attempts to connect to that cell.

A UE using short TTI during the random access procedure (e.g., for preamble transmission) may experience RLF more frequently since preamble transmissions using short TTI may have a higher likelihood of failure since shortening the transmission in time means less energy is used to transmit the information, and hence the coverage may become worse. This may cause additional signalling in the network due to additional RRC re-establishments as well as causing interruptions in the communication between the UE and network.

According to some embodiments of inventive concepts, a mobile terminal may perform random access faster with reduced risk of increased failure rate.

According to some embodiments of inventive concepts, a mobile terminal may perform random access RA using/on different TTI durations, which may be referred to as RA using multiple TTI types. According to some embodiments, a mobile terminal may perform RA on two different TTI durations, for example, a short TTI duration and a long TTI duration, but it should be appreciated that inventive concepts may be generalized to be used for more than two TTI durations. TTI in this regard refers to a transmission duration over the air interface.

When the mobile terminal uses a TTI duration for at least a part of the communication with the network during the procedure, at least one message associated with the random access procedure is sent using that TTI duration. For example, the random access preambles and random access response may be sent using a short TTI while message 3 (RRCConnectionRequest) is sent using another TTI duration, but it also covers that all messages associated with the random access procedure are sent using that TTI duration.

According to some embodiments, a short TTI RA failure may trigger a long TTI RA.

In one embodiment, the mobile terminal may perform a random access procedure using a first TTI duration (e.g., a short TTI duration) for at least a part of the communication with the network during the procedure, and the mobile terminal will upon failure of this random access procedure perform a random access procedure using a second TTI duration (e.g., a long TTI duration).

If the random access procedure using the second TTI duration fails, the UE may consider the radio link to have failed. For example, the UE may in an LTE/NR network trigger a procedure such as Radio Link Failure (RLF). An example implementation in medium access control MAC is discussed below:

if the Random Access Preamble is transmitted using a short TTI:
    consider the Random Access procedure unsuccessfully completed;
    initiate a Random Access Procedure on a long TTI duration,
  else:
    indicate a Random Access problem to upper layers;

According to some embodiments, a mobile terminal may perform Parallel RA procedures using short and long TTI RA.

The mobile terminal may perform random access procedures in parallel for two (or more) TTI durations. The mobile terminal would then maintain one set of counters and/or states for each random access procedure. The UE may then, when it should initiate a random access procedure, initiate one procedure on a short TTI and one on a long TTI.

To run the procedures in parallel may have the benefit that delay is reduced since if the mobile terminal is in a scenario where the short TTI does not have good coverage and hence the likelihood of success of that procedure is low, the mobile terminal does not have to wait for that procedure to fail (which it likely will) before the UE can perform random access on the long TTI. On the other hand, if the mobile terminal does have good coverage, the Random Access procedure may be completed relatively quickly using the short TTI RA.

The mobile terminal may independently stop these random access procedures. For example, if the mobile terminal has transmitted a certain number of preambles on a short TTI, the UE may stop the RA procedure on the short TTI while continuing the RA procedure on the long TTI. If the mobile terminal has transmitted a certain number of preambles on a long TTI the UE may stop the RA procedure on the long TTI.

According to some embodiments, when a first RA procedure ends a second RA procedure may also be stopped, while the second RA procedure would not stop the first RA procedure. For example, a RA procedure on a long TTI may stop the RA procedure on a short TTI, while ending the RA procedure on a short TTI does not stop the RA procedure on the long TTI. An example implementation in MAC is discussed below:

if the Random Access procedure is performed on a short TTI:
  consider the Random Access procedure unsuccessfully completed;
else:
  indicate a Random Access problem to upper layers;

The mobile terminal may maintain different counters of transmitted preambles for different TTI durations. The mobile terminal can then apply different behaviors when these two counters meets their corresponding thresholds. For example, when one counter associated with a long TTI duration meets a threshold the mobile terminal may trigger RLF; while if a counter associated with a short TTI duration meets a threshold, RLF is not triggered and instead the mobile terminal may just stop transmitting preambles for the short TTI duration (while continuing transmitting preambles for the long TTI duration).

Different TTI durations may have different thresholds for a maximum number of preambles to transmit, i.e., the maximum number of preambles to transmit for the short TTI random access procedure may be different than the maximum number of preambles to transmit for the long TTI random access procedure.

In another approach, the mobile terminal may maintain one counter which is increased (or decreased depending on how the counter is implemented) regardless of if the preamble is sent on a short TTI or on a long TTI. The threshold which this single counter should meet for RLF to be triggered may then need to be higher compared to the approach with two separate counters. If this approach is used then the mobile terminal may trigger RLF if the counter meets the threshold since that may then mean that at least a certain number of long TTI preambles have been transmitted.

According to some embodiments, the mobile terminal may continue to send preambles on the short TTI random access procedure, which may include not checking if the number of preambles sent for the short TTI random access procedure has met a certain maximum number of preamble transmissions and hence not taking any actions when this happens. This could be achieved by considering the threshold for the short TTI to be infinity.

Application of embodiments discussed above may be determined as discussed below.

It may not be wanted that the UE performs a random access on a short TTI in all situations. For example, a random access procedure which is executed for the sake of synchronizing an uplink (i.e. time alignment) for one or more secondary cells may not be considered a high priority procedure. In this scenario, it may be sufficient that the UE performs a random access procedure which only utilizes resources using one TTI duration.

According to some embodiments, the mobile terminal conditionally performs a random access procedure where multiple TTI durations are utilized. Example conditions may include:

Configuration: the mobile terminal or UE may decide whether to apply a RA using multiple TTI types based on configuration, for example, based on RRC configuration. If the mobile terminal has received a configuration for sTTI, the UE may apply the behaviors herein. That is, there could either be an explicit configuration of which TTI length(s) to apply during random access or it can be implicit to use the TTI length(s) that are configured for the mobile terminal also for random access. If several TTI lengths are allowed (either several TTI lengths configured or no configuration), the choice for random access can depend on other criteria, e.g., listed in procedure text or also configured in RRC.

Type of RA: For example the mobile terminal may only apply the behaviors if the mobile terminal is performing a contention free RA, while not if the UE performs a contention based RA.

Trigger for RA: If the RA is triggered to imitate an RRC connection the UE may apply the behaviors while not if the UE performs a RA based on a trigger from the network, such as a PDCCH order for RA.

Coverage situation. A threshold could be defined for the power (e.g., the transmission power of the random access preamble) and broadcast in system information below/above which the mobile terminal should only use 1 ms TTI/use short TTI. Alternatively, the threshold could be defined in estimated received power at the mobile terminal, e.g. RSRP. That is, if the received power is below the threshold the long TTI is used, otherwise the short TTI is used. As an alternative to including the threshold information in system information, the network could indicate the threshold using dedicated signaling, e.g., through RRC. In this case the network could treat different UEs differently in the cell. For example, for mobile terminals UEs that strictly require a short latency (if exceeding a short latency bound the access attempt can be considered wasted) the threshold could be set aggressively (to have the UE use the short TTI in most/all of its accesses).

An alternative to adopting the TTI length based on coverage is to do it based on estimated interference levels. In this case, a threshold based on signal quality, SINR, C/I or similar could be defined. Similarly, as for adopting the threshold based on coverage, a longer TTI could also help in an interference limited scenario. The signaling of the threshold could as for the coverage threshold be included in system information or signaled dedicated to the device.

It should be noted that the above embodiments could also be combined in a way that for example short TTI is only allowed and that the mobile terminal could only use the short TTI if it is above a signaled threshold. This implies that if the mobile terminal is, for example, out of coverage for the short TTI (i.e., below the signal level threshold) the mobile terminal will consider it being outside of the cell coverage and can trigger measurements for cell reselection.

According to some embodiments disclosed herein, failure of a RA on sTTI may trigger RA on long TTI and if that also fails then RLF is then triggered.

Operations of a wireless terminal UE will now be discussed with reference to the flow charts of FIGS. 5-10. For example, modules may be stored in mobile terminal memory 305 of FIG. 3, and these modules may provide instructions so that when the instructions of a module are executed by mobile terminal processor 303, processor 303 performs respective operations of the flow charts of FIG. 5-10.

Figure 5:
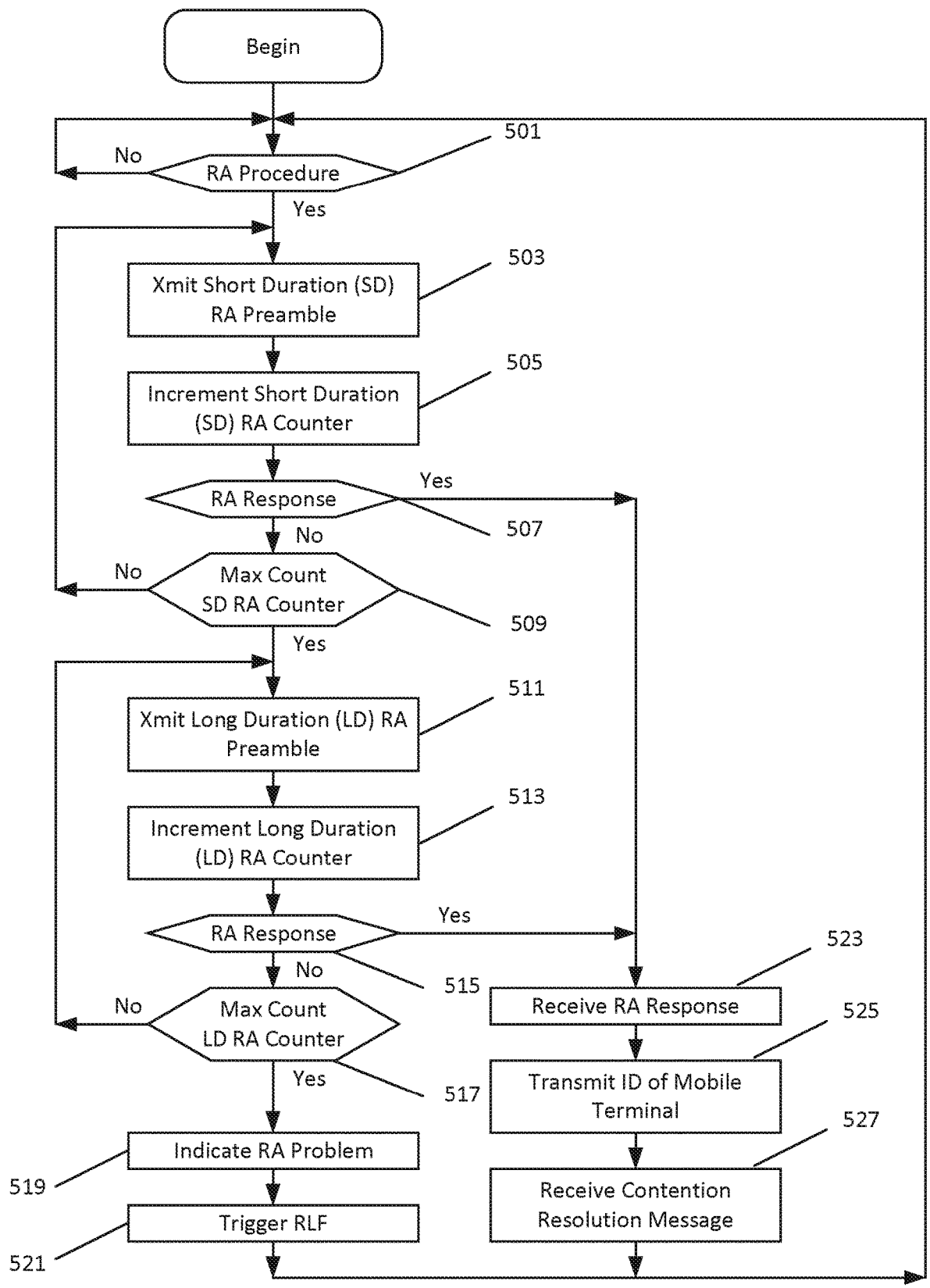
FIGS. 5-10 are flow charts illustrating operations of a mobile terminal according to some embodiments of inventive concepts.

FIG. 5 is a flow chart illustrating operations performed by mobile terminal processor 303 where short TTI RA failure triggers a long TTI RA procedure according to some embodiments of inventive concepts. At block 501, processor 303 may determine whether a RA procedure should be performed (e.g., responsive to arrival of uplink data for transmission to the base station of the radio access network RAN, and/or responsive to a trigger received from the base station). Responsive to determining that a RA procedure should be performed, processor 303 may perform random access using short duration (SD) RA preambles at blocks 503, 505, 507, and 509, and if the RA using SD RA preambles fails, processor may then perform random access using long duration (LD) RA preambles at blocks 511, 513, 515, and 517.

At block 503, processor 303 may transmit a short duration RA preamble for the RA procedure through transceiver 301 to the base station, wherein the short duration RA preamble is transmitted using a short duration transmission time interval, TTI. Responsive to transmitting the SD RA preamble at block 503, processor 303 may increment an SD RA counter at block 505. Processor 303 may repeat operations of blocks 503 and 505 until either an RA response is received from the base station at block 507 or a maximum number of SD RA preambles have been transmitted at block 509 based on the SD RA counter. If the maximum number of SD RA preambles have been transmitted at block 509 without having received an RA response at block 507, the random access attempt using SD RA preambles is deemed to have failed and processor 303 proceeds with random access using LD RA preambles.

At block 511, processor 303 may transmit a long duration RA preamble for the RA procedure through transceiver 301 to the base station, wherein the long duration RA preamble is transmitted using a long duration TTI, with the long duration TTI being longer than the short duration TTI. Responsive to transmitting the SD RA preamble at block 511, processor 303 may increment an LD RA counter at block 513. Processor 303 may repeat operations of blocks 511 and 513 until either an RA response is received from the base station at block 515 or a maximum number of SD RA preambles have been transmitted at block 517 based on the LD RA counter. If the maximum number of LD RA preambles have been transmitted at block 517 without having received an RA response at block 515, the random access attempt using LD RA preambles is deemed to have failed and processor 303 proceeds at block 519 to indicate an RA problem to a higher layer of a communication stack and/or at block 521 to trigger a radio link failure RLF procedure.

If an RA response is received from the base station at block 507 responsive to an SD RA preamble or at block 515 responsive to an LD RA preamble, processor 303 may proceed at blocks 523, 525, and/or 527 with operations of the random access procedure. For example, processor 303 may receive the RA response from the base station through transceiver 301 at bock 523, processor 303 may transmit an RRCConnectionRequest message including an identification of the mobile terminal through transceiver 301 at block 525, and/or processor 303 may receive an RRCConnectionSetup message including a contention resolution message from the base station through transceiver 301 at block 527. The RA response of block 523 may include at least one of a timing advance command and/or an assignment of uplink resources. Moreover, the RRCConnectionRequest message including the identification of the mobile terminal may be transmitted using at least one of the timing advance command and/or the assignment of uplink resources from the RA response.

Figure 6:
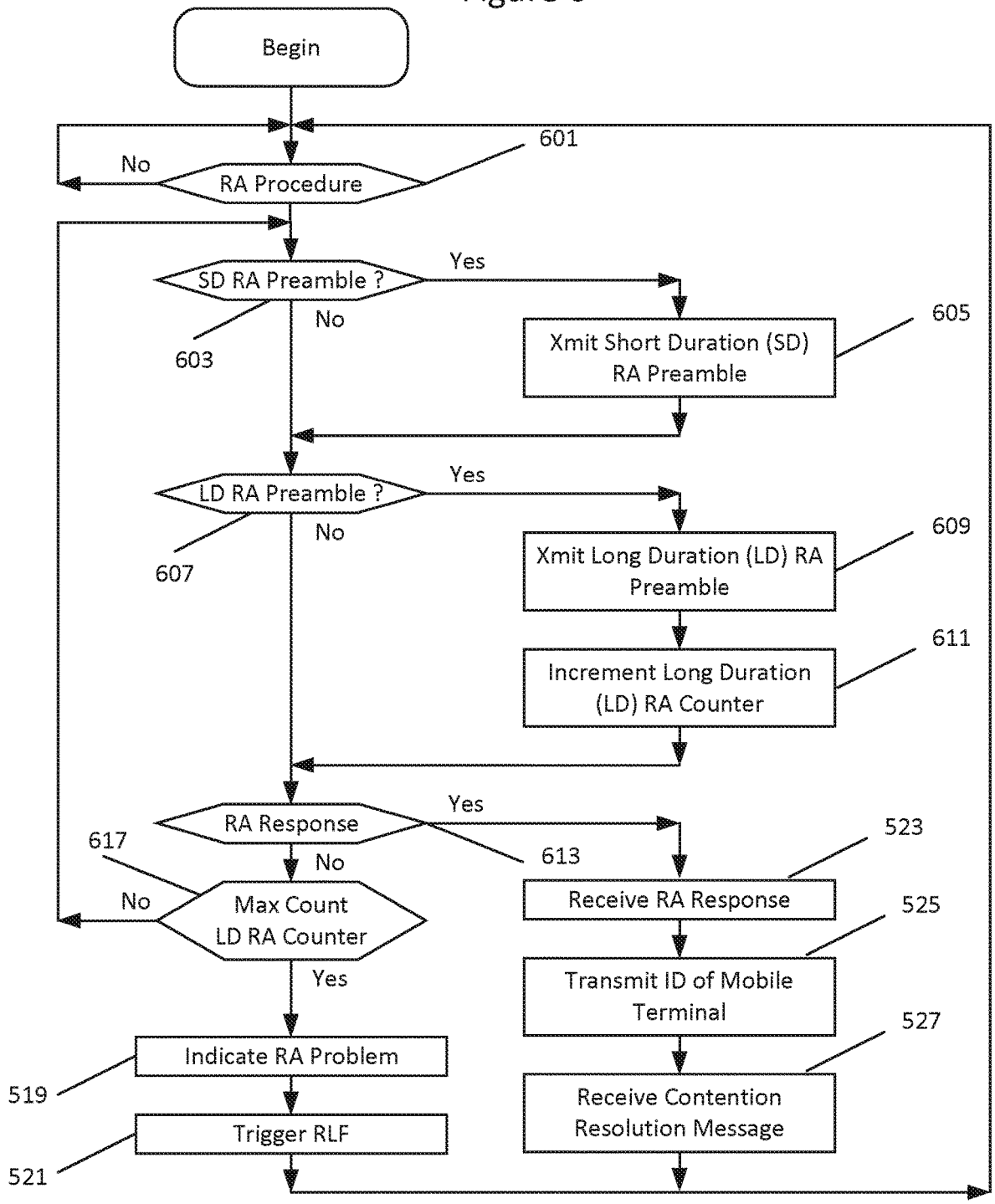

FIG. 6 is a flow chart illustrating parallel transmission of SD and LD RA preambles for an RA procedure according to some embodiments of inventive concepts. At block 601, processor 303 may determine whether a RA procedure should be performed (e.g., responsive to arrival of uplink data for transmission to the base station of the radio access network RAN, and/or responsive to a trigger received from the base station). Responsive to determining that a RA procedure should be performed, processor 303 may perform random access using short duration (SD) and long duration (LD) RA preambles in parallel at blocks 603, 605, 607, 609, and 611. With SD and LD RA preambles being transmitted in parallel, transmission of at least one of the one of the LD RA preambles may occur between transmission of two of the SD RA preambles.

Processor 303 may determine whether to transmit an SD RA preamble of the RA procedure at block 603, and processor 303 may determine whether to transmit an LD RA preamble of the RA procedure at block 607. Responsive to determining to transmit an SD RA preamble at block 603, processor 303 may transmit a short duration RA preamble for the RA procedure through transceiver 301 to the base station at block 605, with the short duration RA preamble being transmitted using a short duration transmission time interval TTI. Responsive to determining to transmit an LD RA preamble at block 607, processor 303 may transmit a long duration RA preamble for the RA procedure through transceiver 301 to the base station at block 609, with the long duration RA preamble being transmitted using a long duration TTI longer than the short duration TTI. Responsive to transmitting the LD RA preamble at block 609, processor 303 may increment an LD RA counter at block 611.

Operations of blocks 603, 605, 607, 609, and 611 may be repeated until an RA response is received from the base station at block 613 or a maximum count of the LD RA counter is detected at block 617. Because a separate counter is not maintained for the SD RA preambles, processor 303 may transmit SD RA preambles at blocks 603 and 605 for the RA procedure until completion of transmitting the maximum number of LD RA preambles for the RA procedure (unless an RA response is received earlier).

Responsive to receiving an RA response at block 613 (before a maximum number of LD RA preambles has been transmitted), processor 303 may proceed with random access procedures at blocks 523, 525, and/or 527 as discussed above with respect to FIG. 5. Responsive to detecting a maximum count of the LD RA counter (indicating transmission of a maximum number of LD RA preambles for the RA procedure) at block 617, processor 303 may proceed with operations of blocks 519 and/or 521 as discussed above with respect to FIG. 5.

Figure 7:
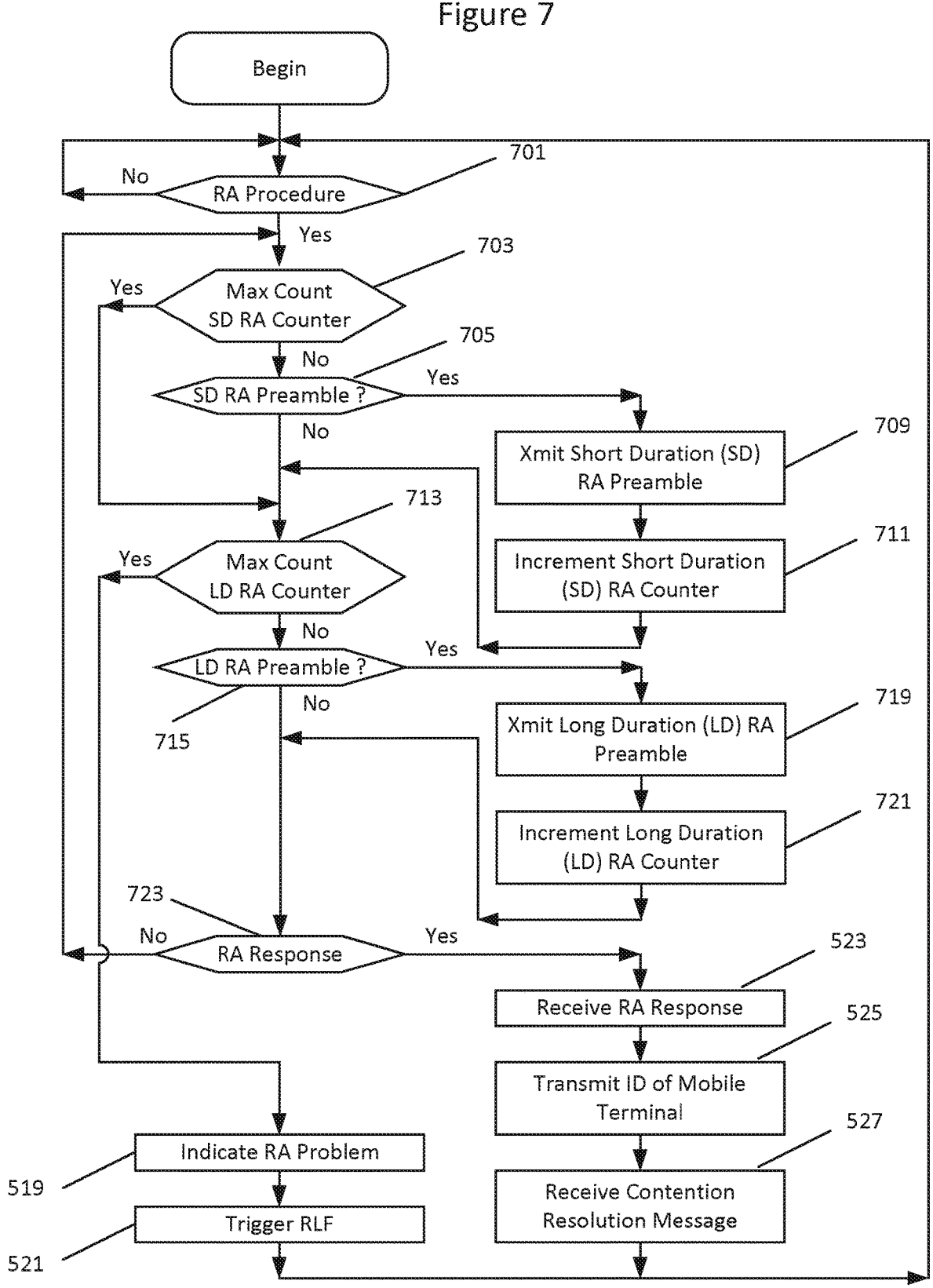

FIG. 7 is a flow chart illustrating parallel transmission of SD and LD RA preambles for an RA procedure with separate SD and LD RA counters according to some embodiments of inventive concepts. At block 701, processor 303 may determine whether a RA procedure should be performed (e.g., responsive to arrival of uplink data for transmission to the base station of the radio access network RAN, and/or responsive to a trigger received from the base station). Responsive to determining that a RA procedure should be performed, processor 303 may perform random access using short duration (SD) and long duration (LD) RA preambles in parallel at blocks 703, 705, 709, 711, 713, 715, 719, 721, and 723. With SD and LD RA preambles being transmitted in parallel, transmission of at least one of the one of the LD RA preambles may occur between transmission of two of the SD RA preambles.

Provided that a maximum count of the SD RA counter has not been reached at block 703, processor 303 may determine whether to transmit an SD RA preamble of the RA procedure at block 705; and provided that a maximum count of the LD RA counter has not been reached at block 713, processor 303 may determine whether to transmit an LD RA preamble of the RA procedure at block 715. Responsive to determining to transmit an SD RA preamble at block 705, processor 303 may transmit a short duration RA preamble for the RA procedure through transceiver 301 to the base station at block 709, with the short duration RA preamble being transmitted using a short duration transmission time interval TTI. Responsive to transmitting the SD RA preamble at block 709, processor 303 may increment an SD RA counter at block 711.

Responsive to determining to transmit an LD RA preamble at block 715, processor 303 may transmit a long duration RA preamble for the RA procedure through transceiver 301 to the base station at block 719, with the long duration RA preamble being transmitted using a long duration TTI longer than the short duration TTI. Responsive to transmitting the LD RA preamble at block 719, processor 303 may increment an LD RA counter at block 721.

Operations of blocks 703, 705, 709, 711, 713, 715, 719, 721, and 723 may be repeated until an RA response is received from the base station at block 723 or a maximum count of the LD RA counter is detected at block 713 (and/or a maximum count of the SD RA counter is detected at block 703). Because a separate counter is maintained for the SD RA preambles, processor 303 may cease transmit SD RA preambles at blocks 705, 709, and 711 for the RA procedure before completion of transmitting the LD RA preambles for the RA procedure (unless an RA response is received earlier). Stated in other words, processor 303 may continue transmitting LD RA preambles after ceasing transmission of SD RA preambles for the RA procedure.

Responsive to receiving an RA response at block 723 (before a maximum number of LD RA preambles has been transmitted), processor 303 may proceed with random access procedures at blocks 523, 525, and/or 527 as discussed above with respect to FIG. 5. Responsive to detecting a maximum count of the LD RA counter (indicating transmission of a maximum number of LD RA preambles for the RA procedure) at block 713 (and/or responsive to detecting a maximum count of the SD RA counter at block 703), processor 303 may proceed with operations of blocks 519 and/or 521 as discussed above with respect to FIG. 5.

Figure 8:
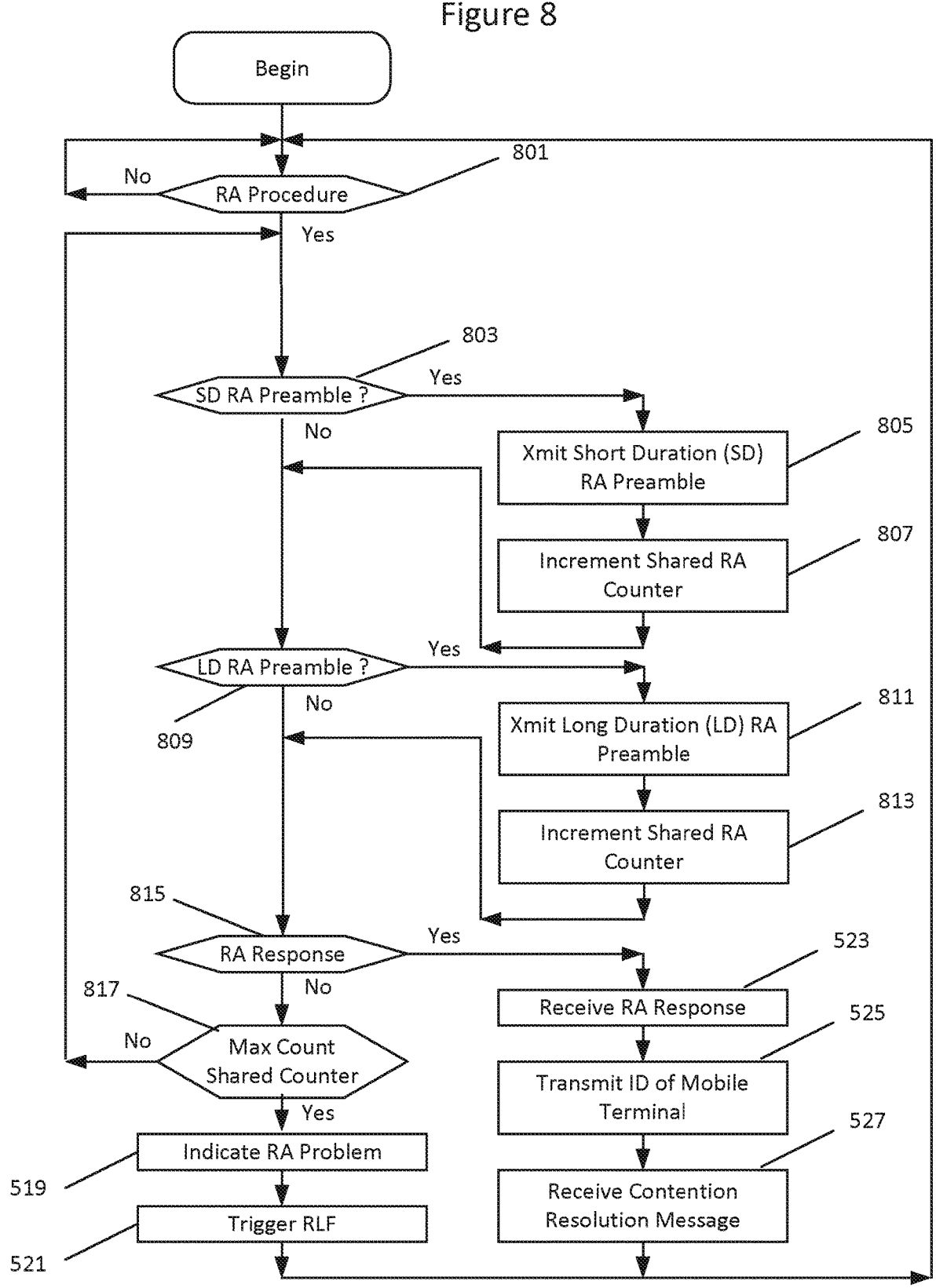

FIG. 8 is a flow chart illustrating parallel transmission of SD and LD RA preambles for an RA procedure with a shared RA counter for SD and LD RA preambles according to some embodiments of inventive concepts. At block 801, processor 303 may determine whether a RA procedure should be performed (e.g., responsive to arrival of uplink data for transmission to the base station of the radio access network RAN, and/or responsive to a trigger received from the base station). Responsive to determining that a RA procedure should be performed, processor 303 may perform random access using short duration (SD) and long duration (LD) RA preambles in parallel at blocks 803, 805, 807, 809, 811, 813, 815, and 817. With SD and LD RA preambles being transmitted in parallel, transmission of at least one of the one of the LD RA preambles may occur between transmission of two of the SD RA preambles.

Processor 303 may determine whether to transmit an SD RA preamble of the RA procedure at block 803, and processor 303 may determine whether to transmit an LD RA preamble of the RA procedure at block 809. Responsive to determining to transmit an SD RA preamble at block 803, processor 303 may transmit a short duration RA preamble for the RA procedure through transceiver 301 to the base station at block 805, with the short duration RA preamble being transmitted using a short duration transmission time interval TTI. Responsive to transmitting the SD RA preamble at block 805, processor 303 may increment a shared RA counter at block 807.

Responsive to determining to transmit an LD RA preamble at block 809, processor 303 may transmit a long duration RA preamble for the RA procedure through transceiver 301 to the base station at block 811, with the long duration RA preamble being transmitted using a long duration TTI longer than the short duration TTI. Responsive to transmitting the LD RA preamble at block 811, processor 303 may increment the shared RA counter at block 813.

Operations of blocks 803, 805, 807, 809, 811, 813, 815, and 817 may be repeated until an RA response is received from the base station at block 815 or a maximum count of the shared RA counter is detected at block 817. Responsive to receiving an RA response at block 815 (before a maximum number of combined RA preambles has been transmitted), processor 303 may proceed with random access procedures at blocks 523, 525, and/or 527 as discussed above with respect to FIG. 5. Responsive to detecting a maximum count of the shared RA counter at block 817, processor 303 may proceed with operations of blocks 519 and/or 521 as discussed above with respect to FIG. 5.

Figure 9:
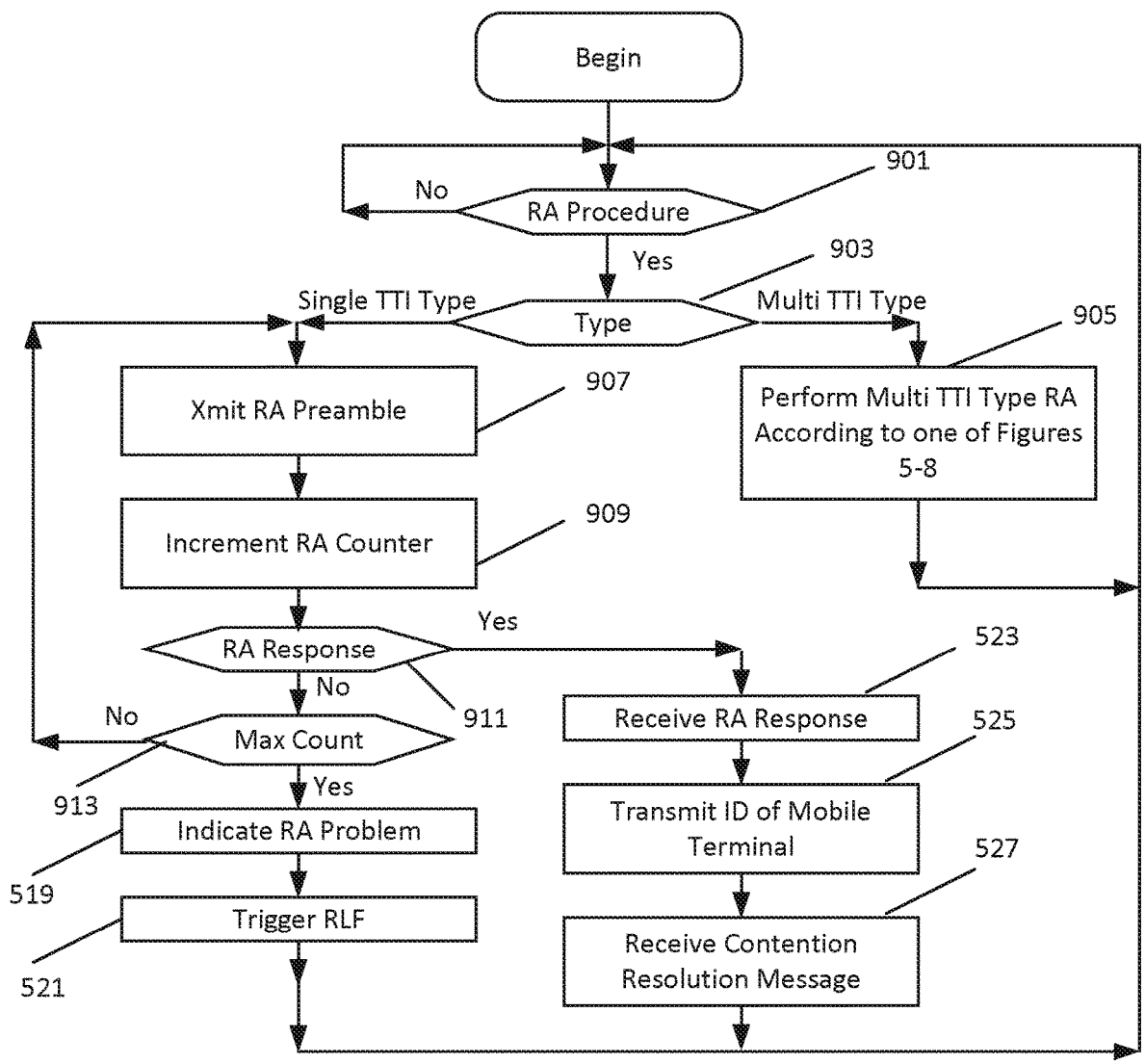

FIG. 9 is a flow chart illustrating use of single and multi TTY type RA procedures according to some embodiments of inventive concepts. At block 901, processor 303 may determine whether a RA procedure should be performed (e.g., responsive to arrival of uplink data for transmission to the base station of the radio access network RAN, and/or responsive to a trigger received from the base station). Responsive to determining that a RA procedure should be performed, processor 303 may determine a type of RA procedure to be used at block 903. Processor 303, for example, may decide to use a single TTI type RA procedure or a multi TTI type RA procedure.

Responsive to a decision to use a multi TTI type RA procedure at block 903, processor 303 may perform a multi TTI type RA procedure at block 905, for example, as discussed above with respect to one or FIGS. 5-8.

Responsive to a decision to use a single TTI type RA procedure at block 903, processor may proceed with a single TTI type RA procedure according to blocks 907, 909, 911, and 913. At block 907, processor 303 may transmit a short duration RA preamble for the RA procedure through transceiver 301 to the base station, with the short duration RA preamble being transmitted using a short duration transmission time interval TTI. Responsive to transmitting the SD RA preamble at block 907, processor 303 may increment an RA counter at block 909. Operations of blocks 907 and 909 may be repeated until either an RA response is received from the base station or a maximum count of the RA counter is detected at block 913. Accordingly, a plurality of the short duration RA preambles may be transmitted at block 907 for the RA procedure of the single TTI type.

Responsive to receiving an RA response at block 911 (before a maximum number of combined RA preambles has been transmitted), processor 303 may proceed with random access procedures at blocks 523, 525, and/or 527 as discussed above with respect to FIG. 5. Responsive to detecting a maximum count of the RA counter at block 913, processor 303 may proceed with operations of blocks 519 and/or 521 as discussed above with respect to FIG. 5.

Processor 303 may determine the type at block 903, for example, based on a configuration received from the radio access network. The type may be configured based on different RRC configurations received from the radio access network.

According to some embodiments, processor 303 may select one RA procedure type for contention free RA and the other RA procedure type for contention base RA. According to still other embodiments, processor 303 may select one RA procedure type to initiate an RRC connection with a radio access network and the other RA procedure type may be used responsive to an RA procedure triggered from the radio access network.

Figure 10:
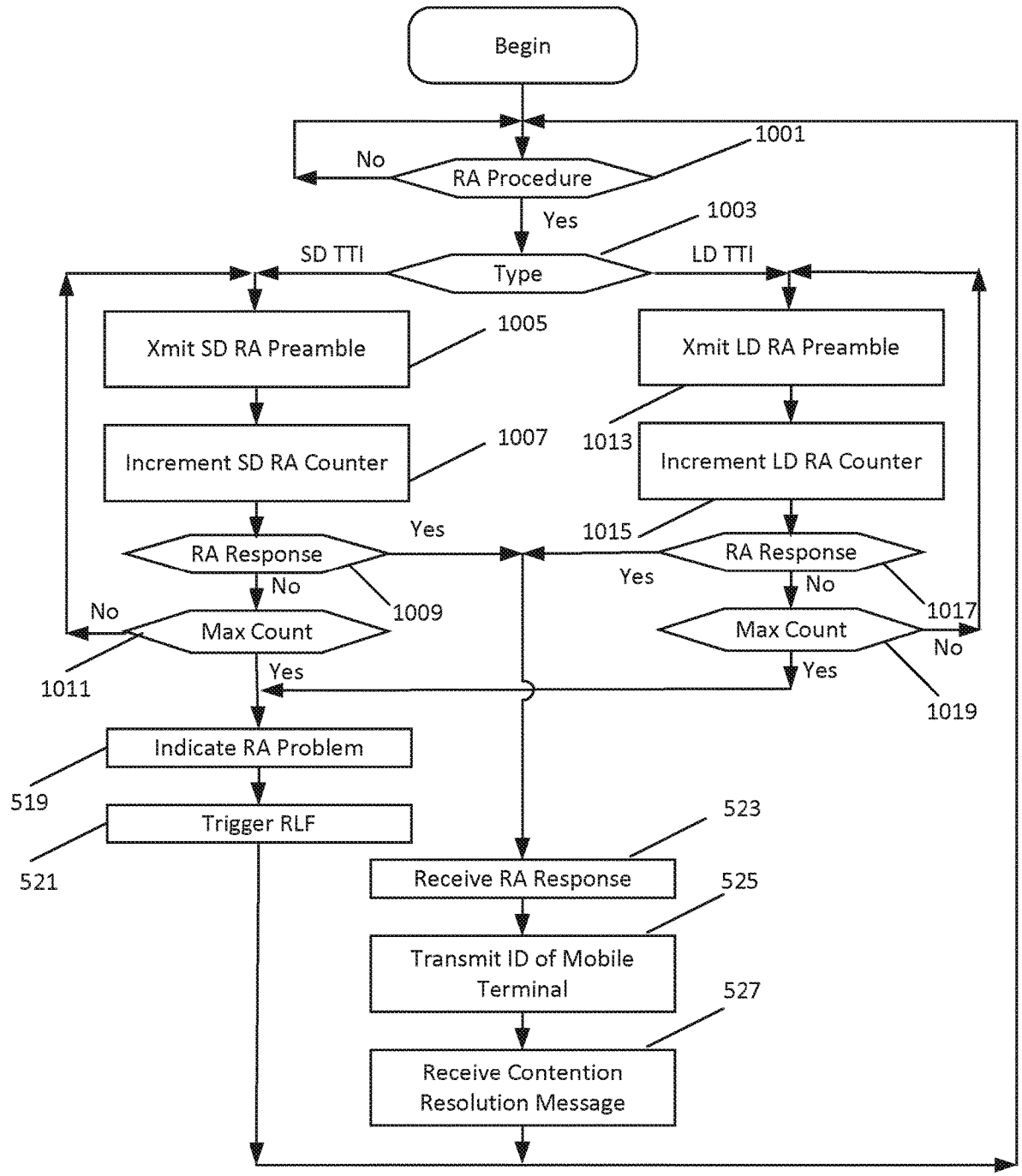

FIG. 10 is a flow chart illustrating use of one TTI type for some RA procedures and another TTI type for other RA procedures. At block 1001, processor 303 may determine whether a RA procedure should be performed (e.g., responsive to arrival of uplink data for transmission to the base station of the radio access network RAN, and/or responsive to a trigger received from the base station). Responsive to determining that a RA procedure should be performed, processor 303 may determine a type of RA procedure to be used at block 1003. Processor 303, for example, may decide to use a short duration SD TTI type RA procedure or a long duration LD TTI type RA procedure.

Responsive to determining to use an SD TTI type RA procedure at block 1003, processor 303 may transmit a short duration RA preamble for the RA procedure through transceiver 301 to the base station at block 1005, with the short duration RA preamble being transmitted using a short duration transmission time interval TTI. Responsive to transmitting the SD RA preamble at block 1005, processor 303 may increment an SD RA counter at block 1007. Operations of blocks 1005 and 1007 may be repeated until either an RA response is received from the base station at block 1009 or a maximum count of the SD RA counter is detected at block 1011. Accordingly, a plurality of the short duration RA preambles may be transmitted at block 1005 for the SD RA procedure.

Responsive to determining to use an LD TTI type RA procedure at block 1003, processor 303 may transmit a long duration RA preamble for the RA procedure through transceiver 301 to the base station at block 1013, with the long duration RA preamble being transmitted using a long duration transmission time interval TTI. Responsive to transmitting the LD RA preamble at block 1005, processor 303 may increment an LD RA counter at block 1015. Operations of blocks 1013 and 1015 may be repeated until either an RA response is received from the base station at block 1017 or a maximum count of the LD RA counter is detected at block 1019. Accordingly, a plurality of the long duration RA preambles may be transmitted at block 1013 for the LD RA procedure.

Responsive to receiving an RA response for the SD TTI type RA procedure at block 1009 or responsive to receiving an RA response for the LD TTI type RA procedure at block 1017, processor may proceed with random access procedures at blocks 523, 525, and/or 527 as discussed above with respect to FIG. 5. Responsive to detecting a maximum count of the SD RA counter at block 1011 for the SD TTI type RA procedure or responsive to detecting a maximum count of the LD RA counter at block 1019 for the LD TTI type RA procedure, processor 303 may proceed with operations of blocks 519 and/or 521 as discussed above with respect to FIG. 5.

According to some embodiments, processor 303 may select the RA procedure type at block 1003 based on a power threshold (e.g., an RA preamble transmission power threshold and/or a received power threshold), and the power threshold may be received at the UE from the radio access network. According to some other embodiments, processor 303 may select the RA procedure type at block 1003 based on an estimated interference level threshold (e.g., based on a respective signal quality), and the estimated interference level threshold may be received from the radio access network.

In each of the embodiments of FIGS. 5-10, a short duration TTI (used to transmit each of the SD RA preambles) may have a duration of one of 2, 3, 4, or 7 symbols, and the long duration TTI (used to transmit each of the LD RA preambles) may have a duration of one of 3, 4, 7, 12, or 14 symbols, with the long duration TTI being greater than the short duration TTI.

Various operations of FIGS. 5-10 may be optional with respect to some embodiments of mobile terminals and related methods. Regarding methods of example embodiment 1 (set forth below), for example: operations of blocks 501, 505, 507, 509, 513, 515, 517, 519, 521, 523, 525, and 527 of FIG. 5 may be optional; operations of blocks 601, 603, 607, 611, 613, 617, 519, 521, 523, 525, and 527 of FIG. 6 may be optional; operations of blocks 701, 703, 705, 711, 713, 715, 721, 723, 519, 521, 523, 525, and 527 of FIG. 7 may be optional; and operations of blocks 801, 803, 807, 809, 813, 815, 817, 519, 521, 523, 525, and 527 of FIG. 8 may be optional. Regarding methods of example embodiment 23 (set forth below), for example: operations of blocks 1001, 1003, 1007, 1009, 1011, 1015, 1017, 1019, 519, 521, 523, 525, and 527 of FIG. 10 may be optional.

Example embodiments are discussed below.

1. A method of operating a mobile terminal (UE) to perform a random access, RA, procedure, the method comprising: transmitting (503, 605, 709, 805) a short duration RA preamble for the RA procedure, wherein the short duration RA preamble is transmitted using a short duration transmission time interval, TTI; and transmitting (511, 609, 719, 811) a long duration RA preamble for the RA procedure, wherein the long duration RA preamble is transmitted using a long duration TTI, and wherein the long duration TTI is longer than the short duration TTI.

2. The method of embodiment 1, wherein transmitting the long duration RA preamble comprises transmitting the long duration RA preamble responsive to failure of the RA procedure using the short duration RA preamble.

3. The method of embodiment 1, wherein transmitting the short duration RA preamble comprises transmitting a plurality of short duration RA preambles, and wherein transmitting the long duration RA preamble comprises transmitting the long duration RA preamble responsive to failure to receive a RA response for the RA procedure after transmitting the plurality of short duration RA preambles.

4. The method of any of embodiments 2-3, wherein transmitting the long duration RA preamble comprises transmitting a plurality of long duration RA preambles, the method further comprising: indicating an RA problem to a higher layer of a communication stack responsive to failure to receive an RA response for the RA procedure after transmitting the plurality of long duration RA preambles.

5. The method of any of embodiments 2-4, wherein transmitting the long duration RA preamble comprises transmitting a plurality of long duration RA preambles, the method further comprising: triggering a radio link failure, RLF, procedure responsive to failure to receive a RA response for the RA procedure after transmitting the plurality of long duration RA preambles.

6. The method of embodiment 1, wherein transmitting the short duration RA preamble comprises transmitting a plurality of short duration RA preambles for the RA procedure, wherein transmitting the long duration RA preamble comprises transmitting a plurality of long duration RA preambles for the RA procedure, and wherein transmission of at least one of the plurality of long duration RA preambles occurs between transmission of two of the plurality of short duration RA preambles.

7. The method of embodiment 6, wherein transmitting the plurality of long duration RA preambles comprises continuing transmitting the plurality of long duration RA preambles for the RA procedure after completion of transmitting the plurality of short duration RA preambles for the RA procedure.

8. The method of embodiment 7, wherein transmitting the plurality of short duration RA preambles includes providing a first count of the plurality of short duration RA preambles for the RA procedure and stopping transmitting the plurality of short duration RA preambles for the RA procedure responsive to completion of transmitting the plurality of short duration RA preambles responsive to the first count indicating completion, and wherein transmitting the plurality of long duration RA preambles includes providing a second count of the plurality of long duration RA preambles for the RA procedure.

9. The method of embodiment 8, wherein the first count indicates completion of the plurality of short duration RA preambles based on a maximum number of short duration RA preambles, wherein the second count indicates completion of the plurality of long duration RA preambles based on a maximum number of long duration RA preambles, and wherein the maximum number of short duration RA preambles for the RA procedure and the maximum number of long duration RA preambles for the RA procedure are different.

10. The method of embodiment 6, wherein transmitting the plurality of short duration RA preambles comprises transmitting the plurality of short duration RA preambles for the RA procedure until completion of transmitting the plurality of long duration RA preambles for the RA procedure.

11. The method of embodiment 10, wherein transmitting the plurality of long duration RA preambles includes providing a count of the plurality of long duration RA preambles for the RA procedure, wherein the count indicates completion of transmitting the plurality of long duration RA preambles based on a maximum number of long duration RA preambles.

12. The method of embodiment 6, wherein transmitting the plurality of short duration RA preambles and transmitting the plurality of long duration RA preambles includes providing a shared count of the short and long duration RA preambles, wherein the shared count indicates completion of transmitting the short and long duration RA preambles based on a maximum number of the short and long duration RA preambles combined.

13. The method of any of embodiments 6-12, the method further comprising: indicating an RA problem to a higher layer of a communication stack responsive to failure to receive an RA response for the RA procedure after transmitting the plurality of long duration RA preambles.

14. The method of any of embodiments 6-13, the method further comprising: triggering a radio link failure, RLF, procedure responsive to failure to receive an RA response for the RA procedure after transmitting the plurality of long duration RA preambles.

15. The method of any of embodiments 1-14, wherein the RA procedure is a first RA procedure, wherein the short duration RA preamble is a first short duration RA preamble, and wherein the short duration TTI is a first short duration TTI, the method further comprising: transmitting a second short duration RA preamble for a second RA procedure using a second short duration TTI without transmitting a long duration RA preamble for the second RA procedure.

16. The method of embodiment 15, wherein transmitting the short duration RA preamble and the long duration RA preamble for the first RA procedure comprises transmitting the short duration and long duration RA preambles for the first RA procedure to a radio access network responsive to a first configuration received from the radio access network, and wherein transmitting the second short duration RA preamble for the second RA procedure without transmitting a long duration RA preamble for the second RA procedure is responsive to a second configuration received from the radio access network.

17. The method of embodiment 16, wherein the first and second configurations comprise first and second RRC configurations.

18. The method of embodiment 15, wherein the first RA procedure is a contention free RA procedure and the second RA procedure is a contention based RA procedure.

19. The method of embodiment 15, wherein the first RA procedure is used to initiate an RRC connection with a radio access network, and the second RA procedure is used responsive to an RA procedure triggered from a radio access network.

20. The method of any of embodiments 1-3, 6-8, 11-12, and 15-19, wherein the short duration RA preamble and the long duration RA preamble are transmitted to a base station (eNB), the method further comprising: after transmitting the short duration RA preamble and the long duration RA preamble, receiving an RA response for the RA procedure from the base station (eNB).

21. The method of embodiment 20, wherein the RA response includes at least one of a timing advance command and/or an assignment of uplink resources.

22. The method of embodiment 21, further comprising: transmitting an identity of the mobile terminal to the base station (eNB) using at least one of the timing advance command and/or the assignment of uplink resources from the RA response.

23. A method of operating a mobile terminal (UE) to perform a random access, RA, procedures, the method comprising: transmitting (1005) a short duration RA preamble for a first RA procedure to a radio access network, wherein the short duration RA preamble is transmitted using a short duration transmission time interval, TTI; and transmitting (1013) a long duration RA preamble for a second RA procedure to the radio access network, wherein the long duration RA preamble is transmitted using a long duration TTI, and wherein the long duration TTI is longer than the short duration TTI.

24. The method of embodiment 23, wherein transmitting the short duration RA preamble comprises transmitting the short duration RA preamble for the first RA procedure responsive to a first power being less than a threshold, and wherein transmitting the long duration RA preamble comprises transmitting the long duration RA preamble for the second RA procedure responsive to a second power being greater than the threshold.

25. The method of embodiment 23, wherein transmitting the short duration RA preamble comprises transmitting the short duration RA preamble for the first RA procedure responsive to a first power being greater than a threshold, and wherein transmitting the long duration RA preamble comprises transmitting the long duration RA preamble for the second RA procedure responsive to a second power being less than the threshold.

26. The method of any of embodiments 24-25, wherein each of the first and second powers comprises at least one of a RA preamble transmission power and/or a received power.

27. The method of any of embodiments 24-26, further comprising: receiving the threshold from the radio access network.

28. The method of embodiment 23, wherein transmitting the short duration RA preamble comprises transmitting the short duration RA preamble for the first RA procedure responsive to a first estimated interference level being less than a threshold, and wherein transmitting the long duration RA preamble comprises transmitting the long duration RA preamble for the second RA procedure responsive to a second estimated interference level being greater than the threshold.

29. The method of embodiment 23, wherein transmitting the short duration RA preamble comprises transmitting the short duration RA preamble for the first RA procedure responsive to a first estimated interference level being greater than a threshold, and wherein transmitting the long duration RA preamble comprises transmitting the long duration RA preamble for the second RA procedure responsive to a second estimated interference level being less than the threshold.

30. The method of any of embodiments 28-29, wherein each of the first and second estimated interference levels is based on a respective signal quality.

31. The method of any of embodiments 28-30, further comprising: receiving the threshold from the radio access network.

32. The method of any of embodiments 1-31, wherein the short duration TTI has a duration of one of 2, 3, 4, or 7 symbols, wherein the long duration TTI has a duration of one of 3, 4, 7, 12, or 14 symbols, and wherein the long duration TTI is greater than the short duration TTI.

33. The method of any of embodiments 1-32, wherein the short duration TTI has a duration of no more than 0.5 ms, and wherein the long duration TTI has a duration of 1 ms.

34. A mobile terminal, wherein the mobile terminal is adapted to perform operations according to any of embodiments 1-33.

35. A mobile terminal comprising: a transceiver (301) configured to provide wireless communication in a radio access network; and a processor (303) coupled with the transceiver, wherein the processor is configured to provide radio access network communication through the transceiver, wherein the processor is configured to perform operations according to any of Embodiments 1-33.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 11:
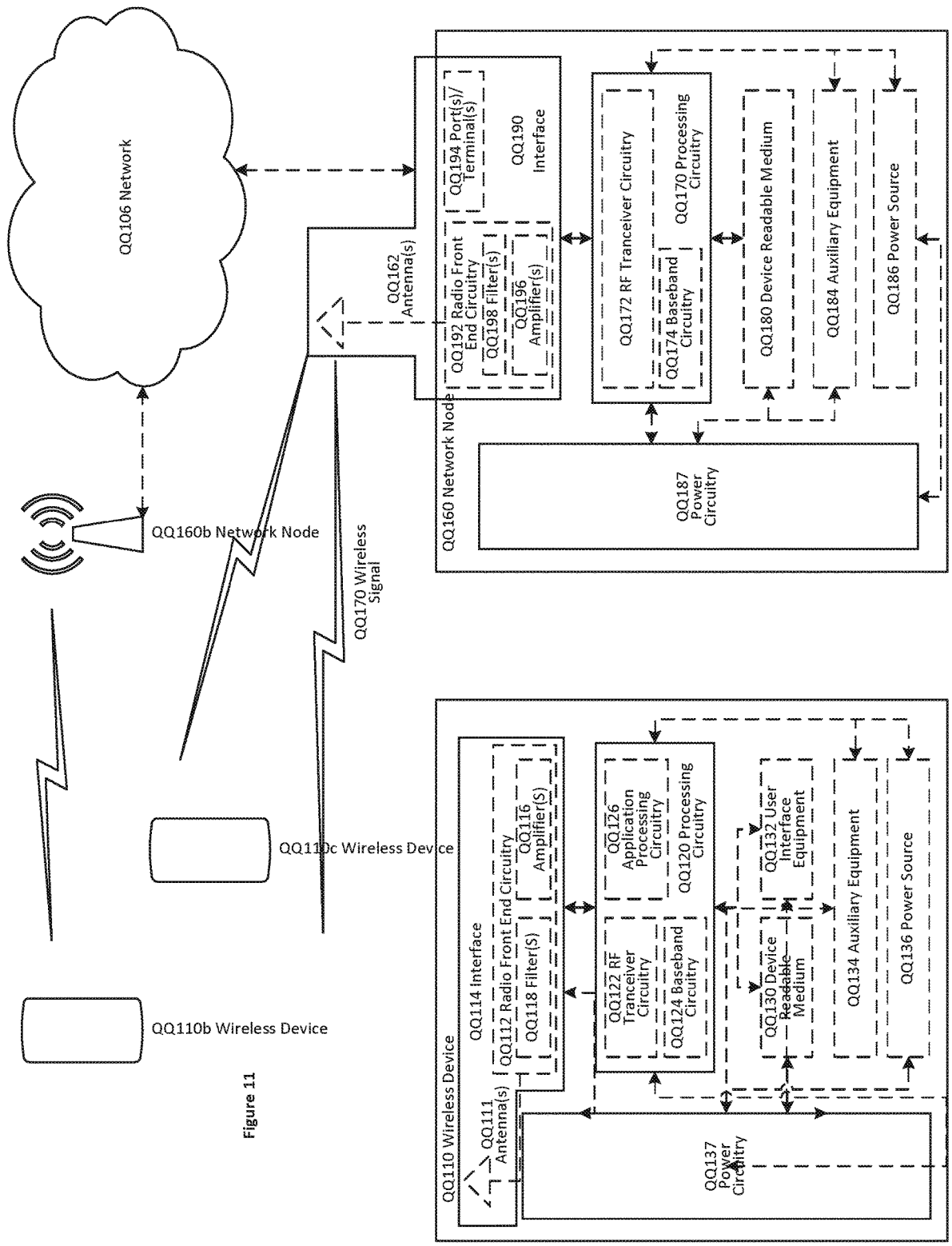
FIG. 11 is a block diagram of a wireless network in accordance with some embodiments.

FIG. 11: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 11 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
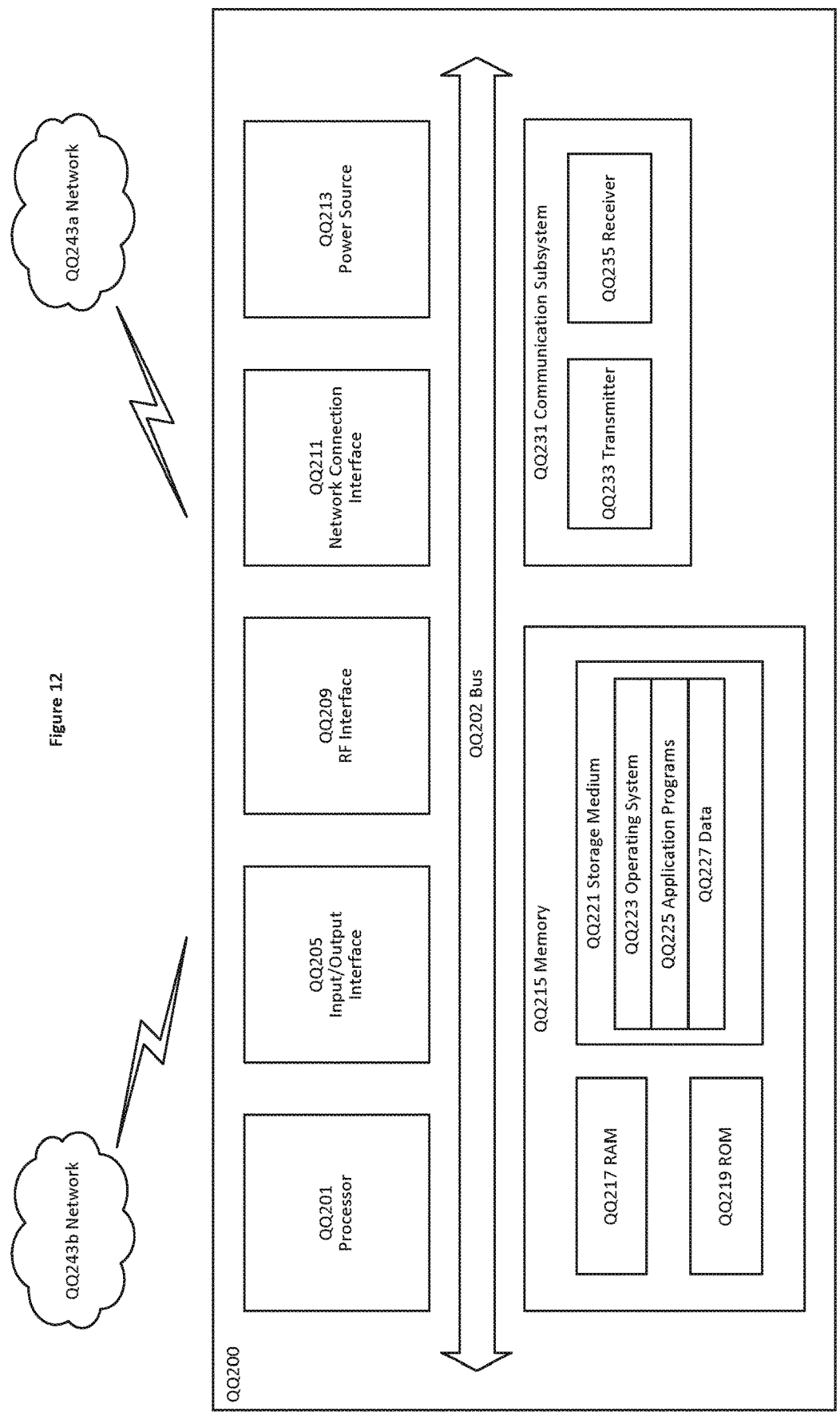
FIG. 12 is a block diagram of a user equipment in accordance with some embodiments

FIG. 12: User Equipment in accordance with some embodiments

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243*a*. Network QQ243*a* may encompass wired and/or wireless networks such as a local-area network (LAN), a wide-area network (WAN), a computer network, a wireless network, a telecommunications network, another like network or any combination thereof. For example, network QQ243*a* may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 13:
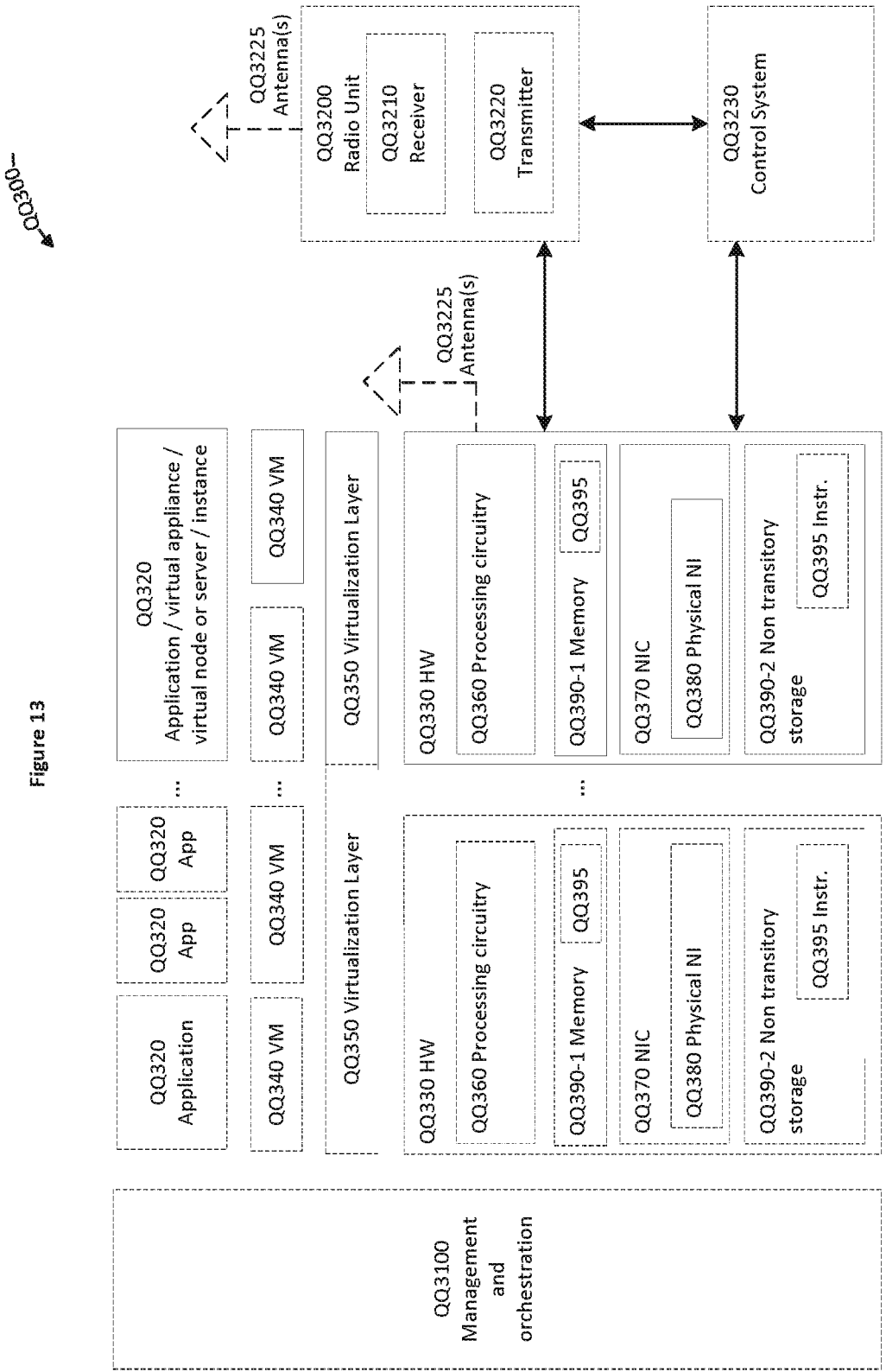
FIG. 13 is a block diagram of a virtualization environment in accordance with some embodiments.

FIG. 13: Virtualization environment in accordance with some embodiments

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 13, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 13.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 14:
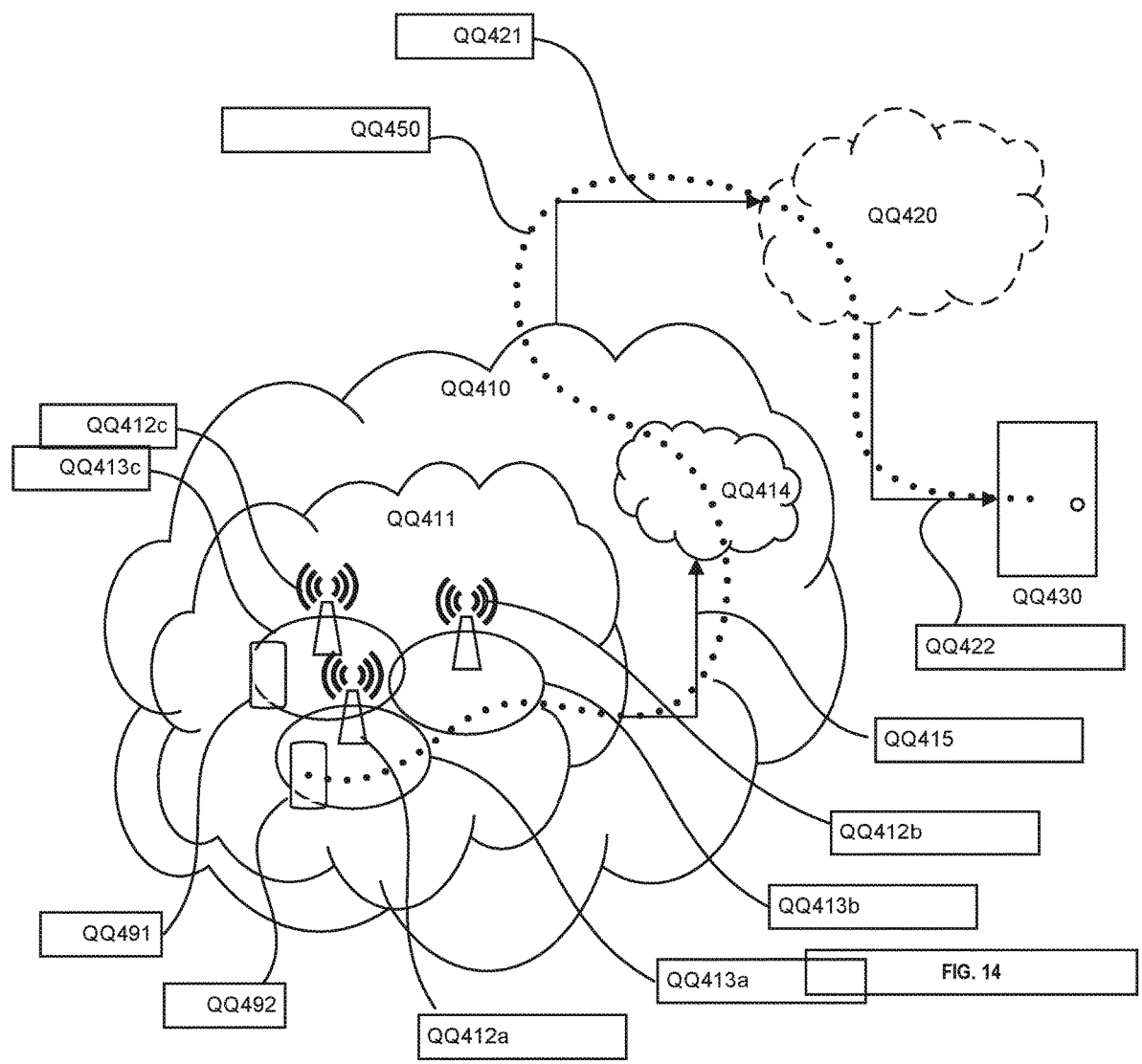
FIG. 14 is a block diagram of a telecommunication network connected via an intermediate network to a host computer in accordance with some embodiments.

FIG. 14: Telecommunication network connected via an intermediate network to a host computer in accordance with some embodiments With reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 15:
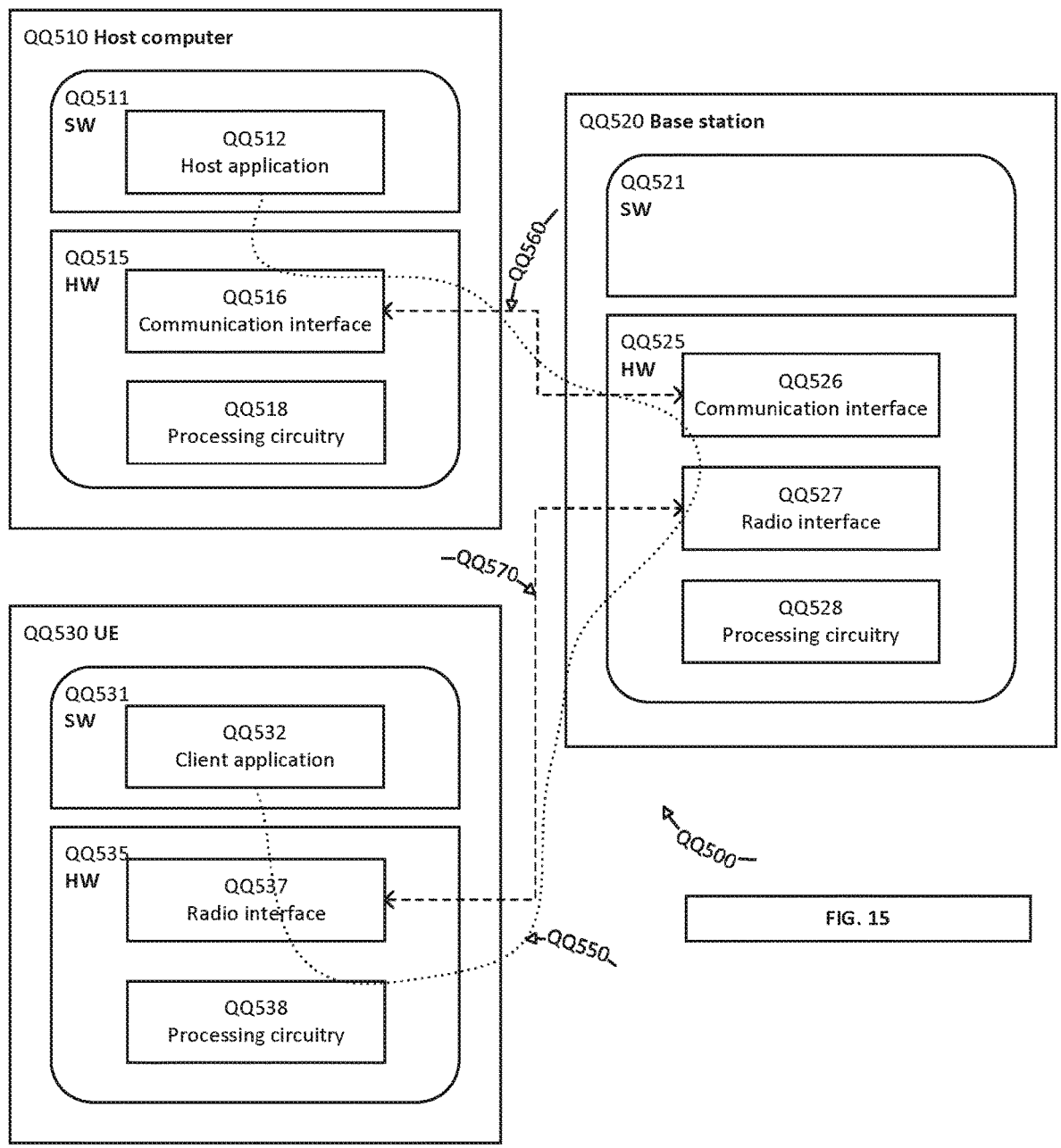
FIG. 15 is a block diagram of a host computer communicating via a base station with a user equipment over a partially wireless connection in accordance with some embodiments.

FIG. 15: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 15. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 15 may be similar or identical to host computer QQ430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 16:
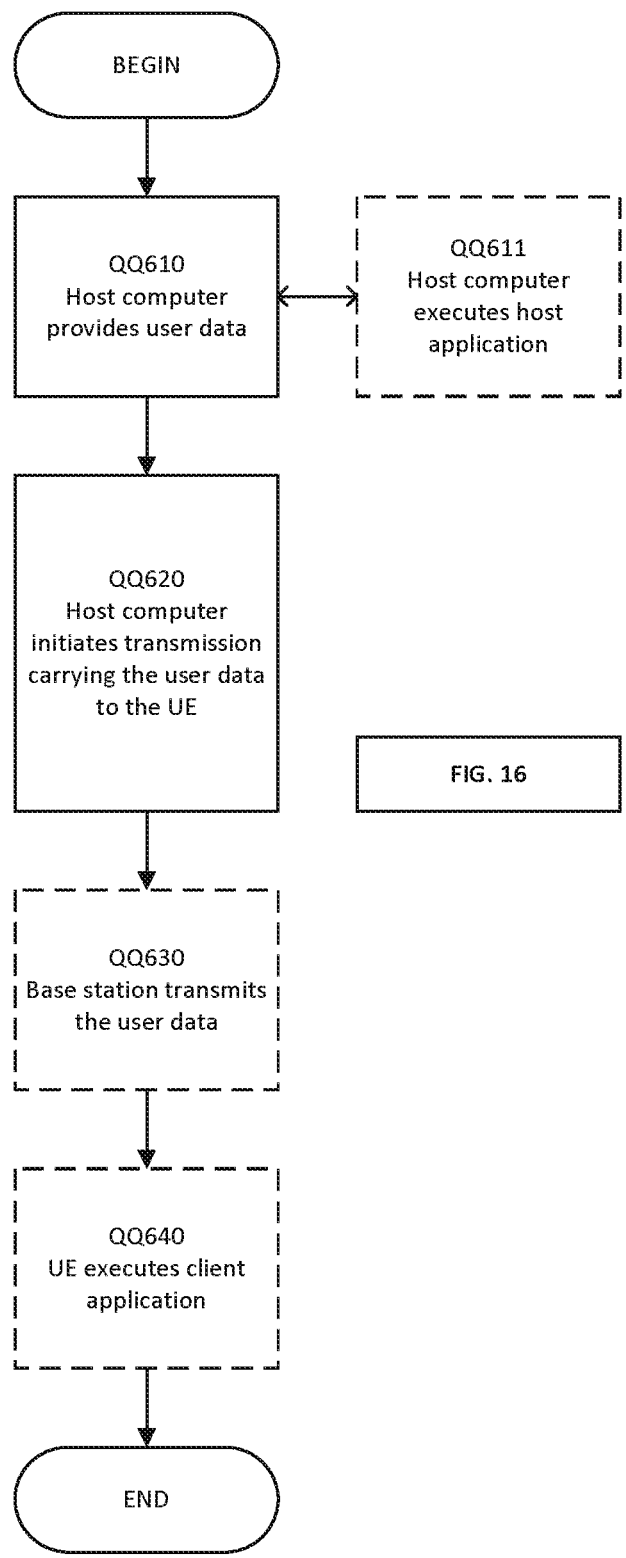
FIG. 16 is a block diagram of methods implemented in a communication system including a host computer, a base station and a user equipment in accordance with some embodiments.

FIG. 16: Methods implemented in a communication system including a host computer, a base station and a user equipment in accordance with some embodiments FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 17:
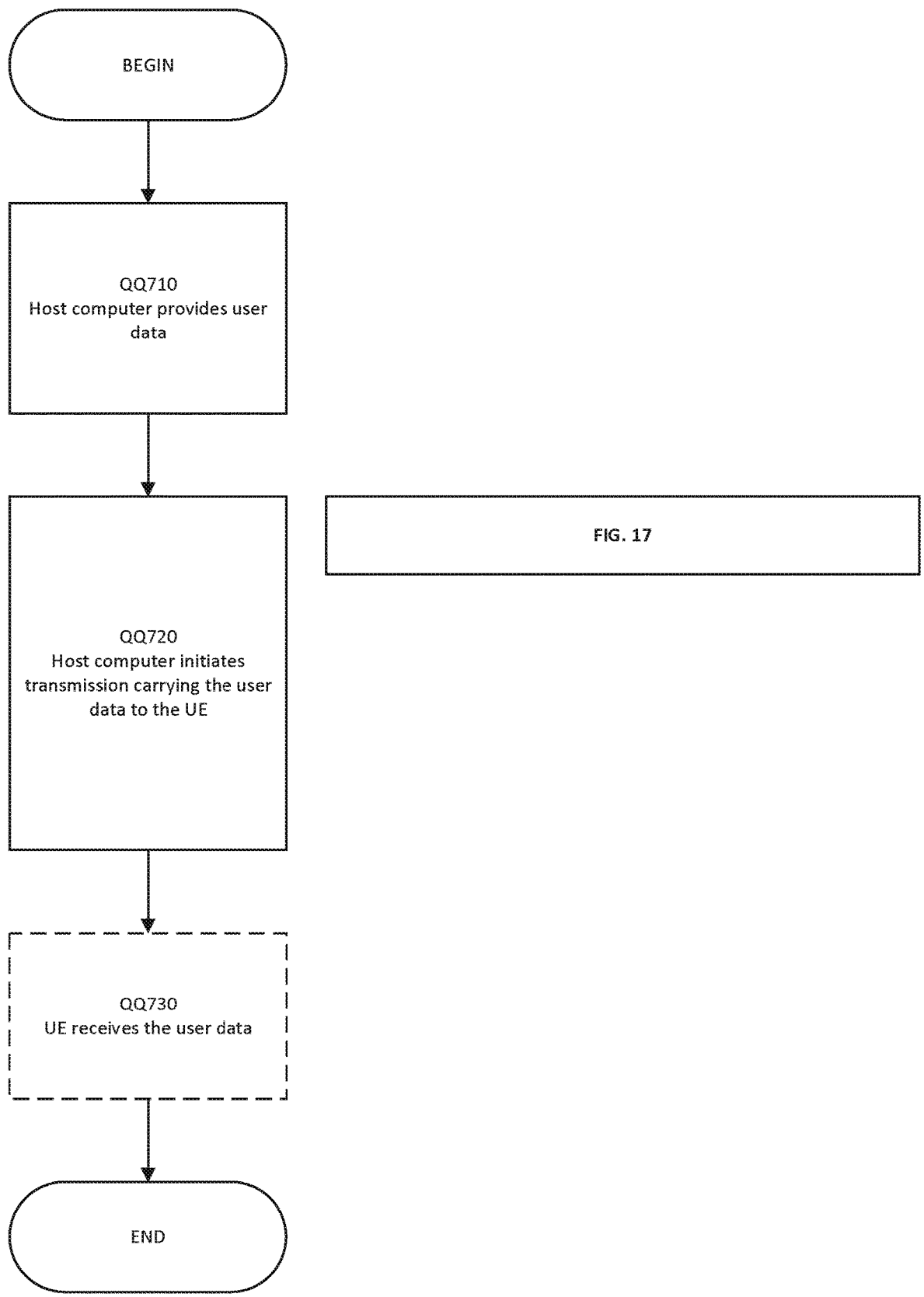
FIG. 17 is a block diagram of methods implemented in a communication system including a host computer, a base station and a user equipment in accordance with some embodiments.

FIG. 17: Methods implemented in a communication system including a host computer, a base station and a user equipment in accordance with some embodiments FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 18:
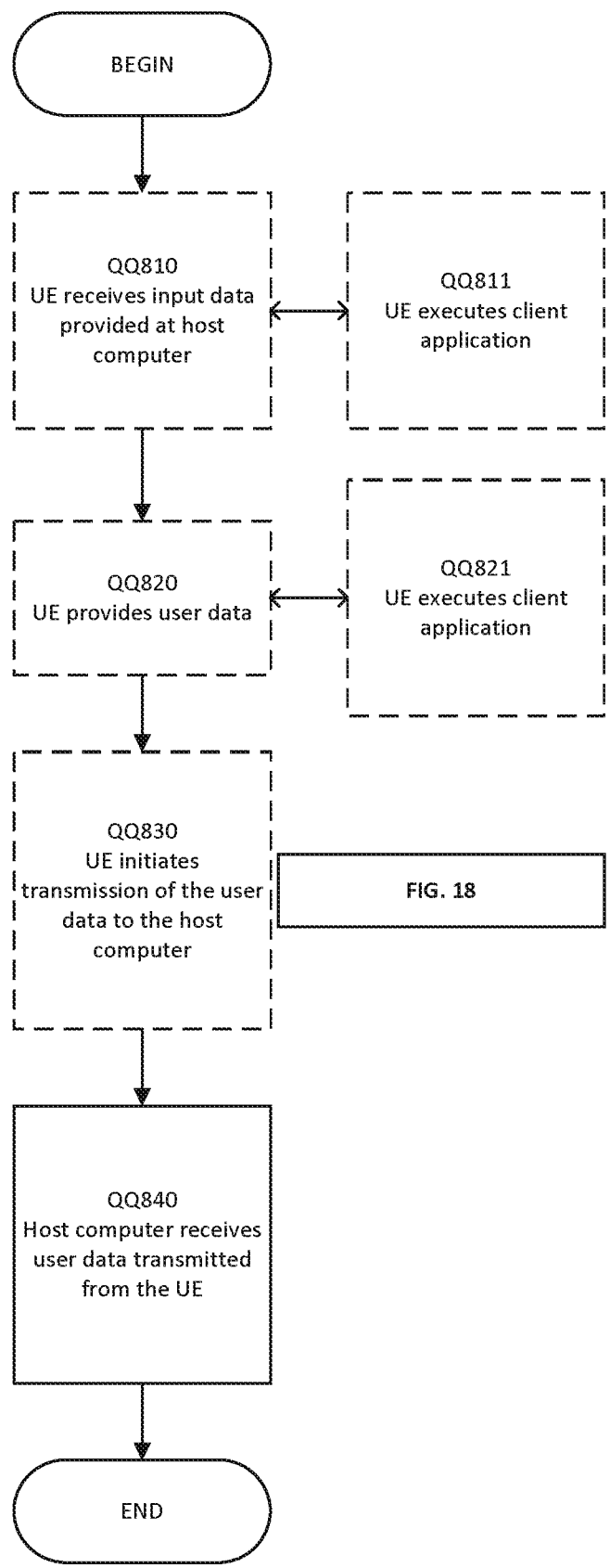
FIG. 18 is a block diagram of methods implemented in a communication system including a host computer, a base station and a user equipment in accordance with some embodiments.

FIG. 18: Methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 19:
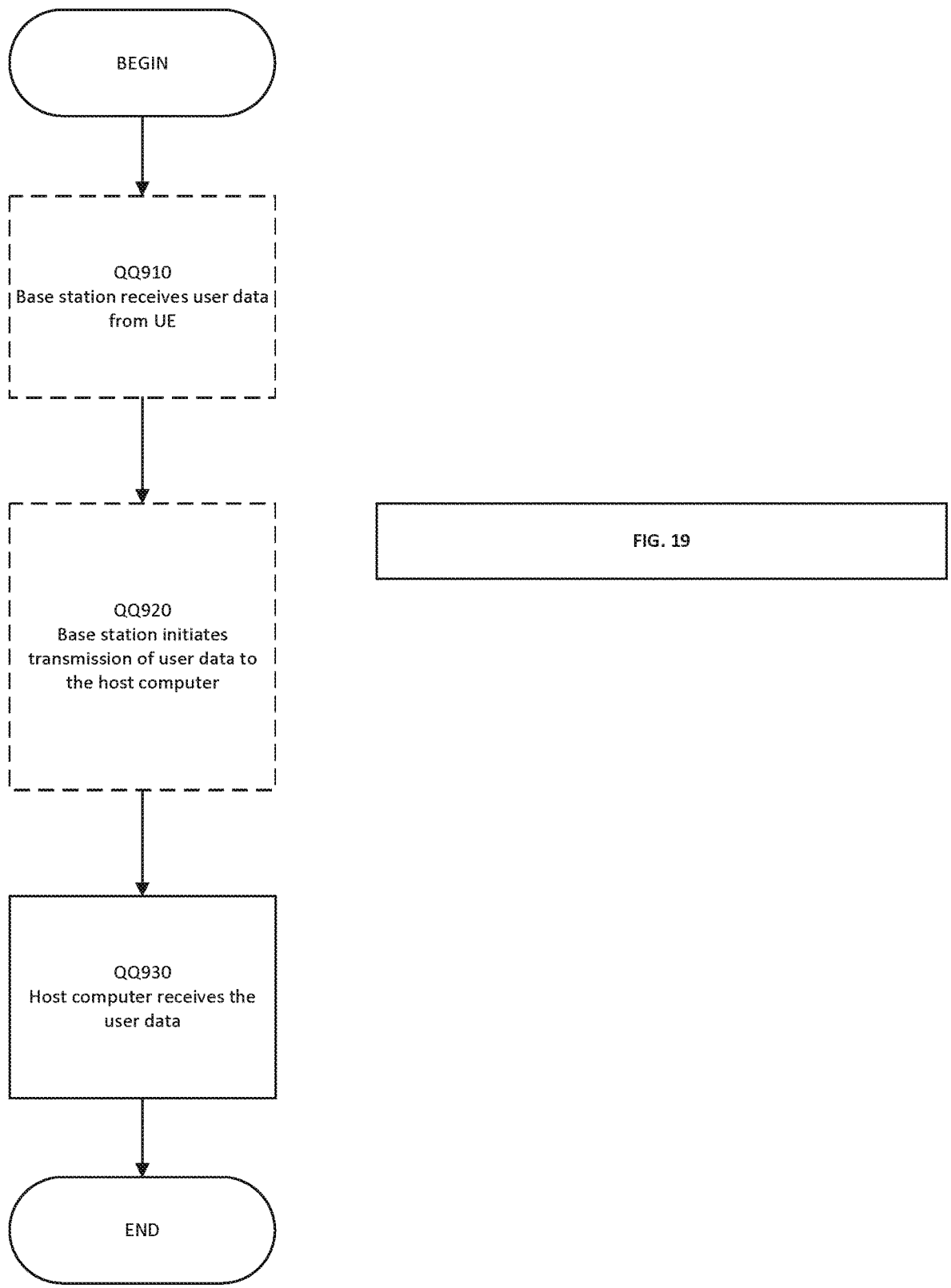
FIG. 19 is a block diagram of methods implemented in a communication system including a host computer, a base station and a user equipment in accordance with some embodiments.

FIG. 19: Methods implemented in a communication system including a host computer, a base station and a user equipment in accordance with some embodiments FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 20:
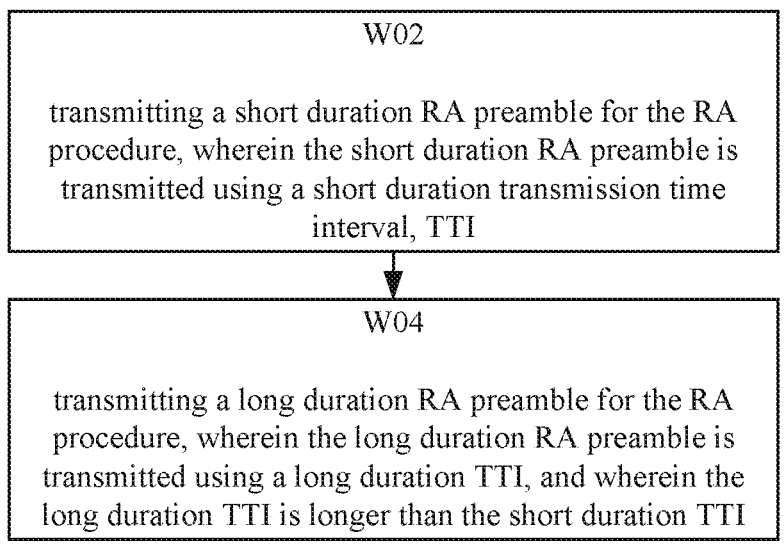
FIGS. 20 and 21 are block diagrams respectively illustrating operations and a virtual apparatus according to some embodiments.

FIG. 20 depicts a method in accordance with some embodiments of operating a mobile terminal (UE) to perform a random access, RA, procedure. The method includes operation W02 of transmitting a short duration RA preamble for the RA procedure, wherein the short duration RA preamble is transmitted using a short duration transmission time interval, TTI. The method also includes operation W04 of transmitting a long duration RA preamble for the RA procedure, wherein the long duration RA preamble is transmitted using a long duration TTI, and wherein the long duration TTI is longer than the short duration TTI.

Figure 21:
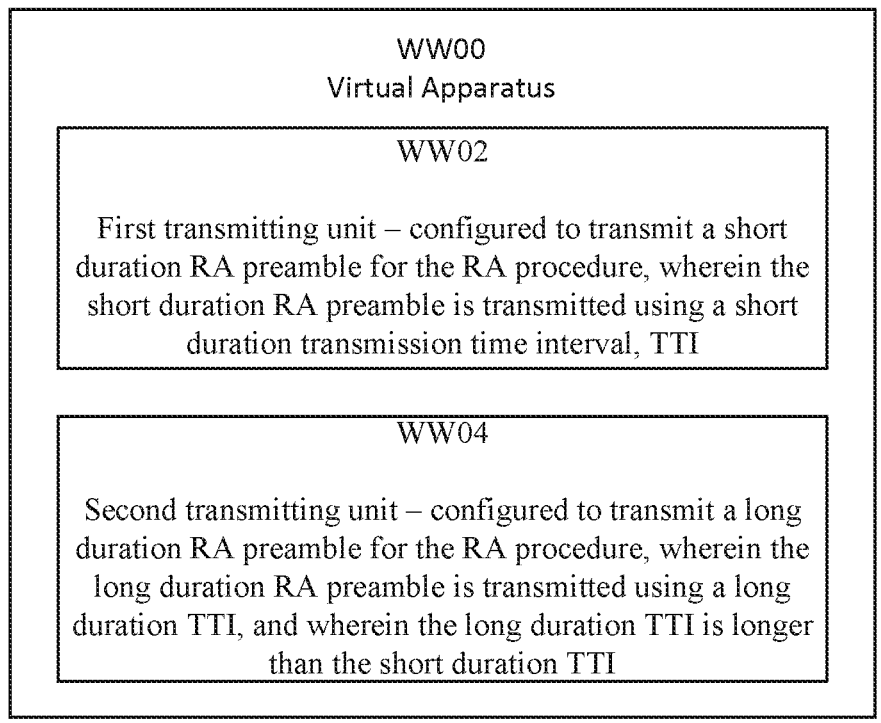

FIG. 21 illustrates a schematic block diagram of an apparatus WW00 in a wireless network (for example, the wireless network shown in FIG. 11). The apparatus may be implemented in a wireless device or network node (e.g., wireless device QQ110 or network node QQ160 shown in FIG. 11). Apparatus WW00 is operable to carry out the example method described with reference to FIG. 20 and possibly any other processes or methods disclosed herein. It is also to be understood that the method of FIG. 20 is not necessarily carried out solely by apparatus WW00. At least some operations of the method can be performed by one or more other entities.

Virtual Apparatus WW00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting unit WW02, second transmitting unit WW04, and any other suitable units of apparatus WW00 to perform corresponding functions according one or more embodiments of the present disclosure.

As illustrated in FIG. 21, apparatus WW00 includes first transmitting unit WW02, and second transmitting unit WW04. First transmitting unit WWO2 is configured to transmit a short duration RA preamble for the RA procedure, wherein the short duration RA preamble is transmitted using a short duration transmission time interval, TTI. Second transmitting unit WW04 is configured to transmit a long duration RA preamble for the RA procedure, wherein the long duration RA preamble is transmitted using a long duration TTI, and wherein the long duration TTI is longer than the short duration TTI.

Figure 22:
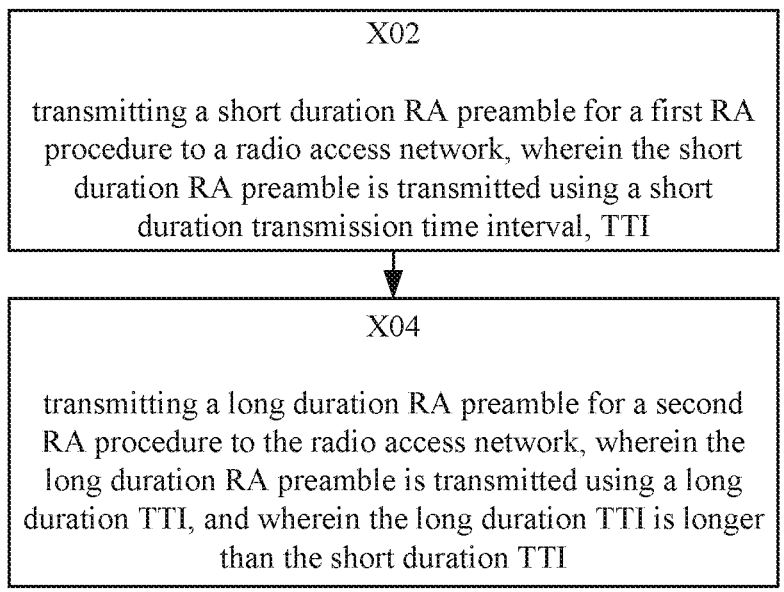
FIGS. 22 and 23 are block diagrams respectively illustrating operations and a virtual apparatus according to some embodiments.

FIG. 22 depicts a method in accordance with some embodiments of operating a mobile terminal (UE) to perform random access, RA, procedures. The method includes operation X02 of transmitting a short duration RA preamble for a first RA procedure to a radio access network, wherein the short duration RA preamble is transmitted using a short duration transmission time interval, TTI. The method also includes operation X04 of transmitting a long duration RA preamble for a second RA procedure to the radio access network, wherein the long duration RA preamble is transmitted using a long duration TTI, and wherein the long duration TTI is longer than the short duration TTI.

Figure 23:
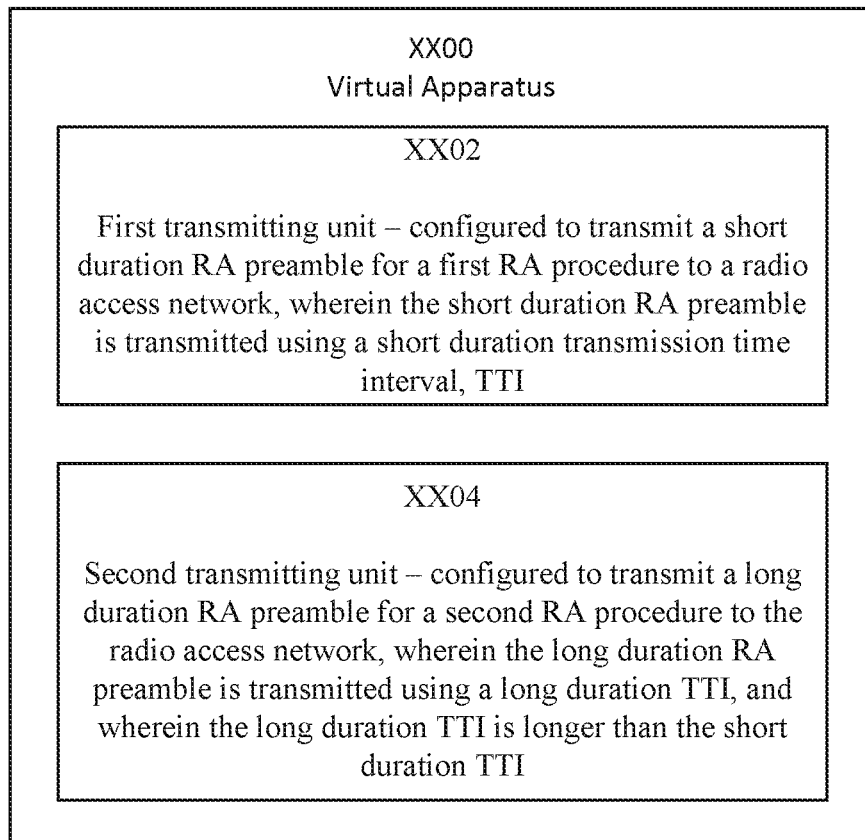

FIG. 23 illustrates a schematic block diagram of an apparatus XX00 in a wireless network (for example, the wireless network shown in FIG. 11). The apparatus may be implemented in a wireless device or network node (e.g., wireless device QQ110 or network node QQ160 shown in FIG. 11). Apparatus XX00 is operable to carry out the example method described with reference to FIG. 22 and possibly any other processes or methods disclosed herein. It is also to be understood that the method of FIG. 22 is not necessarily carried out solely by apparatus XX00. At least some operations of the method can be performed by one or more other entities.

Virtual Apparatus XX00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting unit XX02, second transmitting unit XX04, any other suitable units of apparatus XX00 to perform corresponding functions according one or more embodiments of the present disclosure.

As illustrated in FIG. 21, apparatus WW00 includes first transmitting unit WW02, and second transmitting unit WW04. First transmitting unit WWO2 is configured to transmit a short duration RA preamble for a first RA procedure to a radio access network, wherein the short duration RA preamble is transmitted using a short duration transmission time interval, TTI. Second transmitting unit WW04 is configured to transmit a long duration RA preamble for a second RA procedure to the radio access network, wherein the long duration RA preamble is transmitted using a long duration TTI, and wherein the long duration TTI is longer than the short duration TTI.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1× RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a mobile terminal, UE, to perform a random access, RA, procedure, the method comprising:
    transmitting a short duration RA preamble for the RA procedure, wherein the short duration RA preamble is transmitted using a short duration transmission time interval, TTI; and
    transmitting a long duration RA preamble for the RA procedure, wherein the long duration RA preamble is transmitted using a long duration TTI, and wherein the long duration TTI is longer than the short duration TTI,
    wherein transmitting the long duration RA preamble comprises transmitting the long duration RA preamble responsive to a failure of the RA procedure using the short duration RA preamble, and
    wherein a radio link failure, RLF, procedure is triggered responsive to a failure of the RA procedure using the long duration RA preamble.

2. The method of claim 1, wherein transmitting the short duration RA preamble comprises transmitting a plurality of short duration RA preambles, and wherein transmitting the long duration RA preamble comprises transmitting the long duration RA preamble responsive to failures of the RA procedures associated to any of the plurality of short duration RA preambles.

3. The method of claim 1, wherein transmitting the long duration RA preamble comprises transmitting a plurality of long duration RA preambles, the method further comprising:
    indicating an RA problem to a higher layer of a communication stack responsive to failure to receive an RA response for the RA procedure after transmitting the plurality of long duration RA preambles.

4. The method of claim 1, wherein transmitting the long duration RA preamble comprises transmitting a plurality of long duration RA preambles, the method further comprising:
    triggering the RLF procedure responsive to failure to receive a RA response for the RA procedure after transmitting the plurality of long duration RA preambles.

5. The method of claim 1, wherein the RA procedure is a first RA procedure, wherein the short duration RA preamble is a first short duration RA preamble, and wherein the short duration TTI is a first short duration TTI, the method further comprising:
    transmitting a second short duration RA preamble for a second RA procedure using a second short duration TTI without transmitting a long duration RA preamble for the second RA procedure.

6. The method of claim 5, wherein transmitting the short duration RA preamble and the long duration RA preamble for the first RA procedure comprises transmitting the short duration and long duration RA preambles for the first RA procedure to a radio access network responsive to a first configuration received from the radio access network, and wherein transmitting the second short duration RA preamble for the second RA procedure without transmitting a long duration RA preamble for the second RA procedure is responsive to a second configuration received from the radio access network.

7. The method of claim 6, wherein the first and second configurations comprise first and second RRC configurations.

8. The method of claim 5, wherein the first RA procedure is a contention free RA procedure and the second RA procedure is a contention-based RA procedure.

9. The method of claim 5, wherein the first RA procedure is used to initiate an RRC connection with a radio access network, and the second RA procedure is used responsive to an RA procedure triggered from a radio access network.

10. The method of claim 1, wherein the short duration RA preamble and the long duration RA preamble are transmitted to a base station, eNB, the method further comprising:
after transmitting the short duration RA preamble and the long duration RA preamble, receiving an RA response for the RA procedure from the base station.

11. The method of claim 10, wherein the RA response includes at least one of a timing advance command and/or an assignment of uplink resources.

12. The method of claim 11, further comprising:
transmitting an identity of the mobile terminal to the base station using at least one of the timing advance command and/or the assignment of uplink resources from the RA response.

13. A mobile terminal, UE, comprising:
a transceiver configured to provide wireless communication in a radio access network; and
a processor coupled with the transceiver, wherein the processor is configured to provide radio access network communication through the transceiver, wherein the processor is configured to:
transmit a short duration random access, RA, preamble for a RA procedure, wherein the short duration RA preamble is transmitted using a short duration transmission time interval, TTI; and
transmit a long duration RA preamble for the RA procedure, wherein the long duration RA preamble is transmitted using a long duration TTI, and wherein the long duration TTI is longer than the short duration TTI,
wherein transmitting the long duration RA preamble comprises transmitting the long duration RA preamble responsive to failure of the RA procedure using the short duration RA preamble, and
wherein a radio link failure, RLF, procedure is triggered responsive to a failure of the RA procedure using the long duration RA preamble.

14. The mobile terminal of claim 13, wherein transmitting the short duration RA preamble comprises transmitting a plurality of short duration RA preambles, and wherein transmitting the long duration RA preamble comprises transmitting the long duration RA preamble responsive to failures of the RA procedures associated to any of the plurality of short duration RA preambles.

15. The mobile terminal of claim 13, wherein transmitting the long duration RA preamble comprises transmitting a plurality of long duration RA preambles, wherein the processor is further configured to:
indicate an RA problem to a higher layer of a communication stack responsive to failure to receive an RA response for the RA procedure after transmitting the plurality of long duration RA preambles.

16. The mobile terminal of claim 13, wherein transmitting the long duration RA preamble comprises transmitting a plurality of long duration RA preambles, wherein the processor is further configured to:
trigger the RLF procedure responsive to failure to receive a RA response for the RA procedure after transmitting the plurality of long duration RA preambles.

17. The mobile terminal of claim 13,
wherein transmitting the short duration RA preamble comprises transmitting a plurality of short duration RA preambles for the RA procedure,
wherein transmitting the long duration RA preamble comprises transmitting a plurality of long duration RA preambles for the RA procedure, and
wherein transmission of at least one of the plurality of long duration RA preambles occurs between transmission of two of the plurality of short duration RA preambles.

18. The mobile terminal of claim 13, wherein the short duration RA preamble and the long duration RA preamble are transmitted to a base station (eNB), wherein the processor is further configured to:
receive an RA response for the RA procedure from the base station (eNB) after transmitting the short duration RA preamble and the long duration RA preamble.

19. The mobile terminal of claim 18, wherein the RA response includes at least one of a timing advance command and/or an assignment of uplink resources.

20. The mobile terminal of claim 19, wherein the processor is further configured to:
transmit an identity of the mobile terminal to the base station (eNB) using at least one of the timing advance command and/or the assignment of uplink resources from the RA response.

* * * * *